US010116172B2

(12) United States Patent
Fischer et al.

(10) Patent No.: US 10,116,172 B2
(45) Date of Patent: Oct. 30, 2018

(54) CHARGING DEVICE AND HAND-HELD DEVICE FOR A SMALL MOBILE ELECTRICAL DEVICE

(71) Applicant: TRISA HOLDING AG, Triengen (CH)

(72) Inventors: Franz Fischer, Triengen (CH); Hanspeter Meier, Langenthal (CH)

(73) Assignee: TRISA HOLDING AG, Triengen (CH)

( * ) Notice: Subject to any disclaimer, the term of this patent is extended or adjusted under 35 U.S.C. 154(b) by 86 days.

(21) Appl. No.: 14/896,967

(22) PCT Filed: Jun. 11, 2014

(86) PCT No.: PCT/CH2014/000080
§ 371 (c)(1),
(2) Date: Dec. 9, 2015

(87) PCT Pub. No.: WO2014/198005
PCT Pub. Date: Dec. 18, 2014

(65) Prior Publication Data
US 2016/0134151 A1 May 12, 2016

(30) Foreign Application Priority Data

Jun. 14, 2013 (EP) .................................... 13405071

(51) Int. Cl.
*H02J 7/00* (2006.01)
*H02J 50/90* (2016.01)
(Continued)

(52) U.S. Cl.
CPC ............ *H02J 50/90* (2016.02); *H02J 7/0032* (2013.01); *H02J 7/0044* (2013.01); *H02J 7/04* (2013.01); *H02J 50/12* (2016.02)

(58) Field of Classification Search
CPC ........................................................ H02J 7/025
(Continued)

(56) References Cited

U.S. PATENT DOCUMENTS 6,016,046 A 1/2000 Kaite et al.
7,933,870 B1 4/2011 Webster
(Continued)

FOREIGN PATENT DOCUMENTS

DE 2652700 A1 5/1977
DE 4100272 A1 7/1991
(Continued)

OTHER PUBLICATIONS

Jan. 16, 2015 International Search Report issued in International Patent Application No. PCT/CH2014/000080.
(Continued)

*Primary Examiner* — Edward Tso
*Assistant Examiner* — Ahmed Omar
(74) *Attorney, Agent, or Firm* — Oliff PLC

(57) ABSTRACT

A charging device having contactless transmission of electrical energy in order to supply energy to a wireless hand-held device. An electronic circuit for feeding an inductive energy transmitter is designed to adapt energy fed to the inductive energy transmitter in accordance with energy drawn from the inductive energy transmitter. A hand-held device is designed to interrupt the supply of a load when energy is fed into the hand-held device by means of the inductive energy transmitter.

15 Claims, 17 Drawing Sheets

Figure 1:
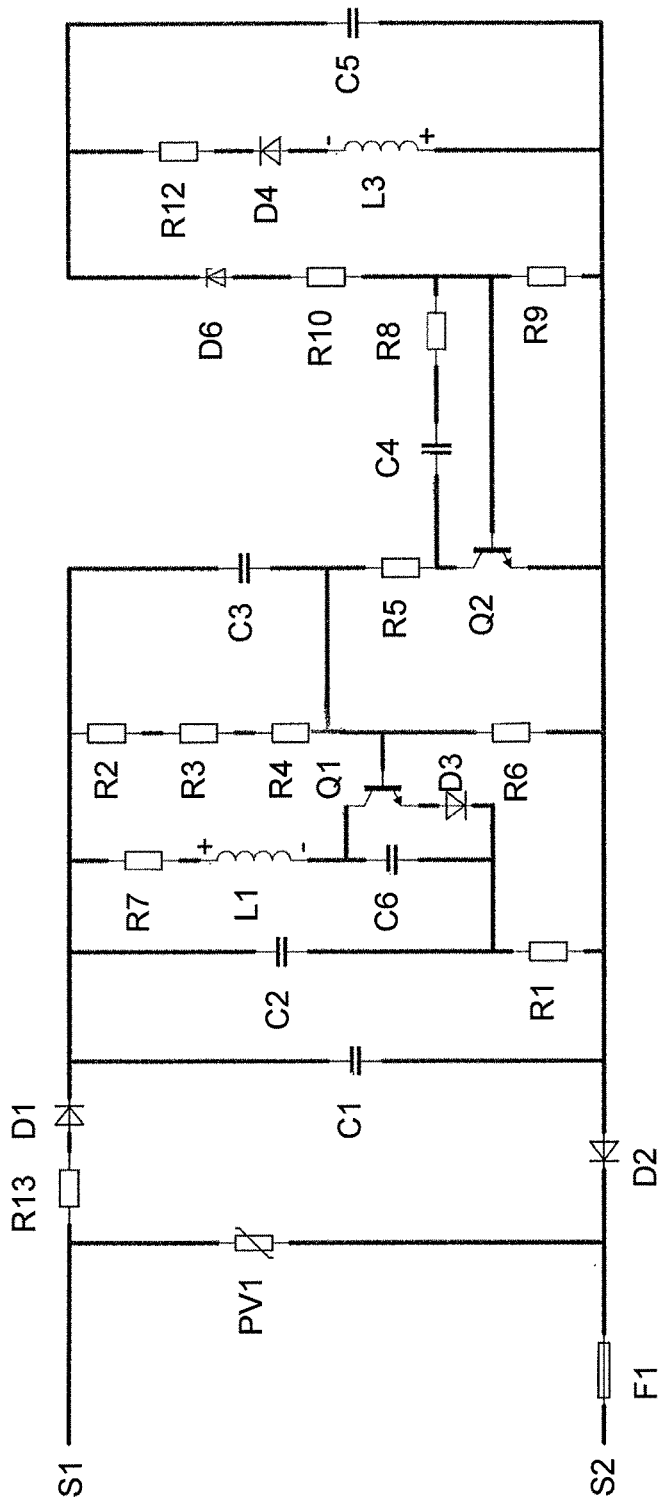

(51) Int. Cl.
*H02J 50/12* (2016.01)
*H02J 7/04* (2006.01)

(58) Field of Classification Search
USPC .......................................................... 320/108
See application file for complete search history.

(56) References Cited

U.S. PATENT DOCUMENTS

| | | | |
|---|---|---|---|
| 8,319,376 | B2 | 11/2012 | Kitamura et al. |
| 2002/0141208 | A1 | 10/2002 | Nanbu et al. |
| 2006/0197493 | A1 | 9/2006 | Kim et al. |
| 2008/0205919 | A1* | 8/2008 | Takagi .................... H02J 7/025 399/50 |
| 2010/0177537 | A1* | 7/2010 | Kitamura ............ H02M 3/3385 363/21.02 |
| 2011/0025264 | A1 | 2/2011 | Mochida et al. |
| 2012/0112543 | A1 | 5/2012 | van Wageningen et al. |
| 2012/0280650 | A1* | 11/2012 | Kim ........................ H02J 17/00 320/108 |
| 2012/0313579 | A1 | 12/2012 | Matsumoto et al. |
| 2015/0102685 | A1* | 4/2015 | Blood ..................... H02J 5/005 307/104 |

FOREIGN PATENT DOCUMENTS

| | | |
|---|---|---|
| EP | 0758153 A2 | 2/1997 |
| EP | 0982831 A2 | 3/2000 |
| EP | 1022840 A2 | 7/2000 |
| EP | 2207250 A1 | 7/2010 |
| WO | 2010/142434 A2 | 12/2010 |

OTHER PUBLICATIONS

Dec. 15, 2015 International Preliminary Report on Patentability issued in International Patent Application No. PCT/CH2014/000080.

Nov. 8, 2017 Office Action issued in European Patent Application No. 14 731 132.8 with partial translation.

* cited by examiner

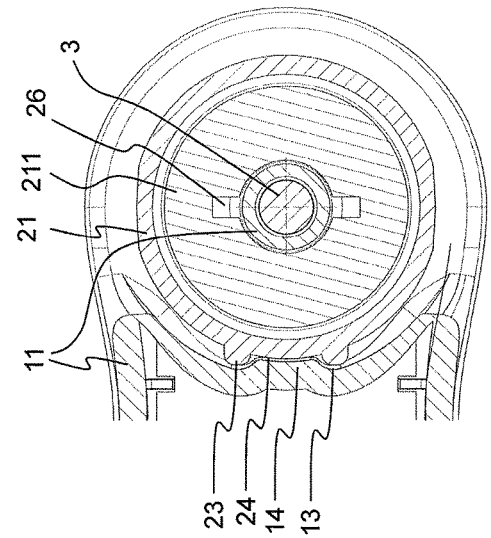
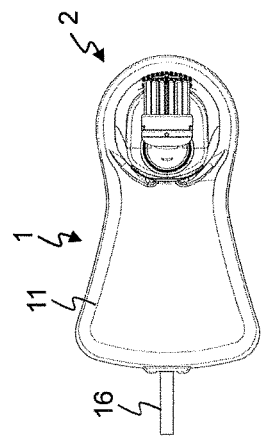
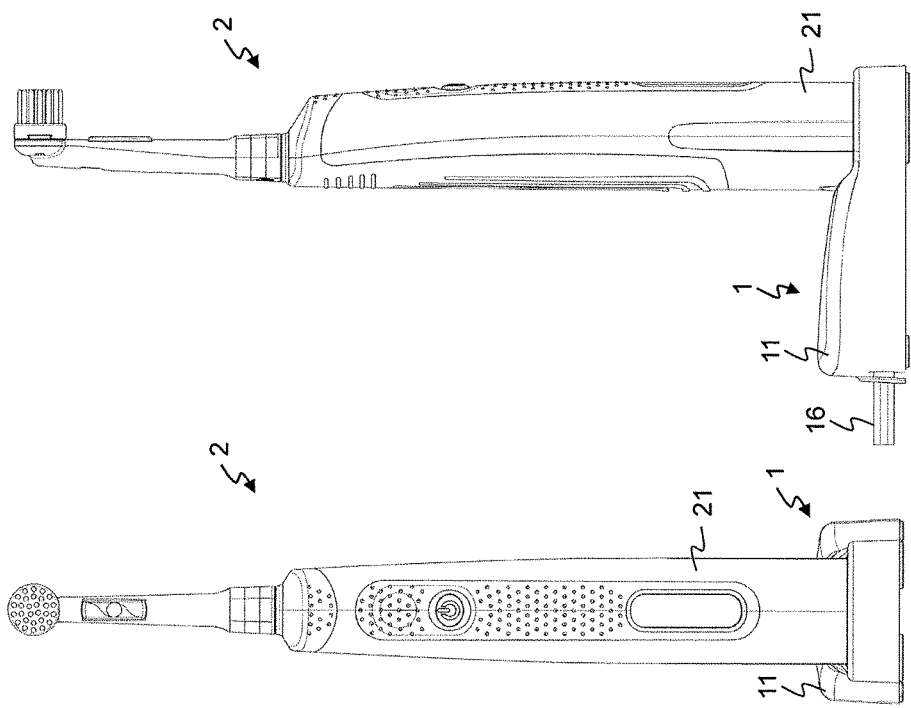
Fig. 10
Fig. 9
Fig. 8
Fig. 7

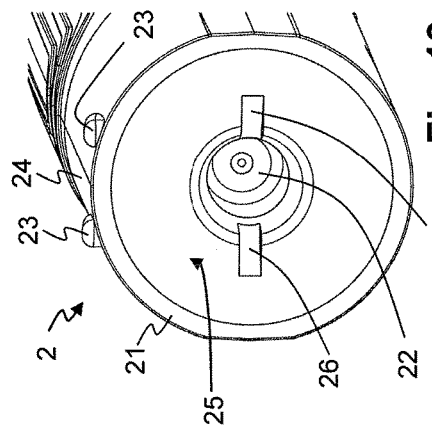
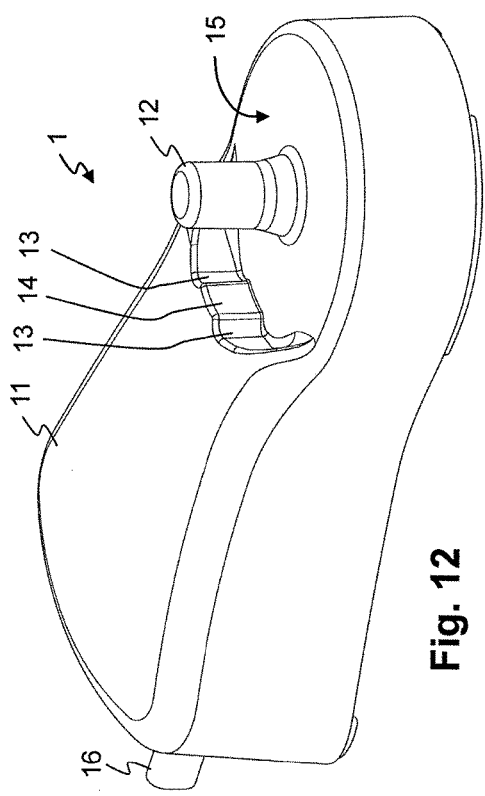
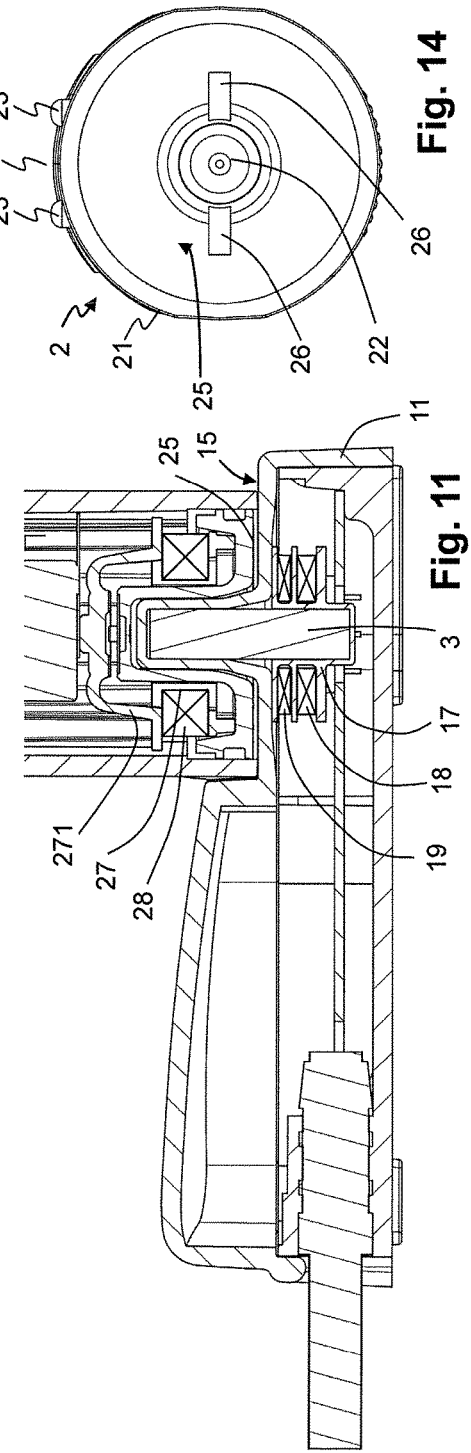

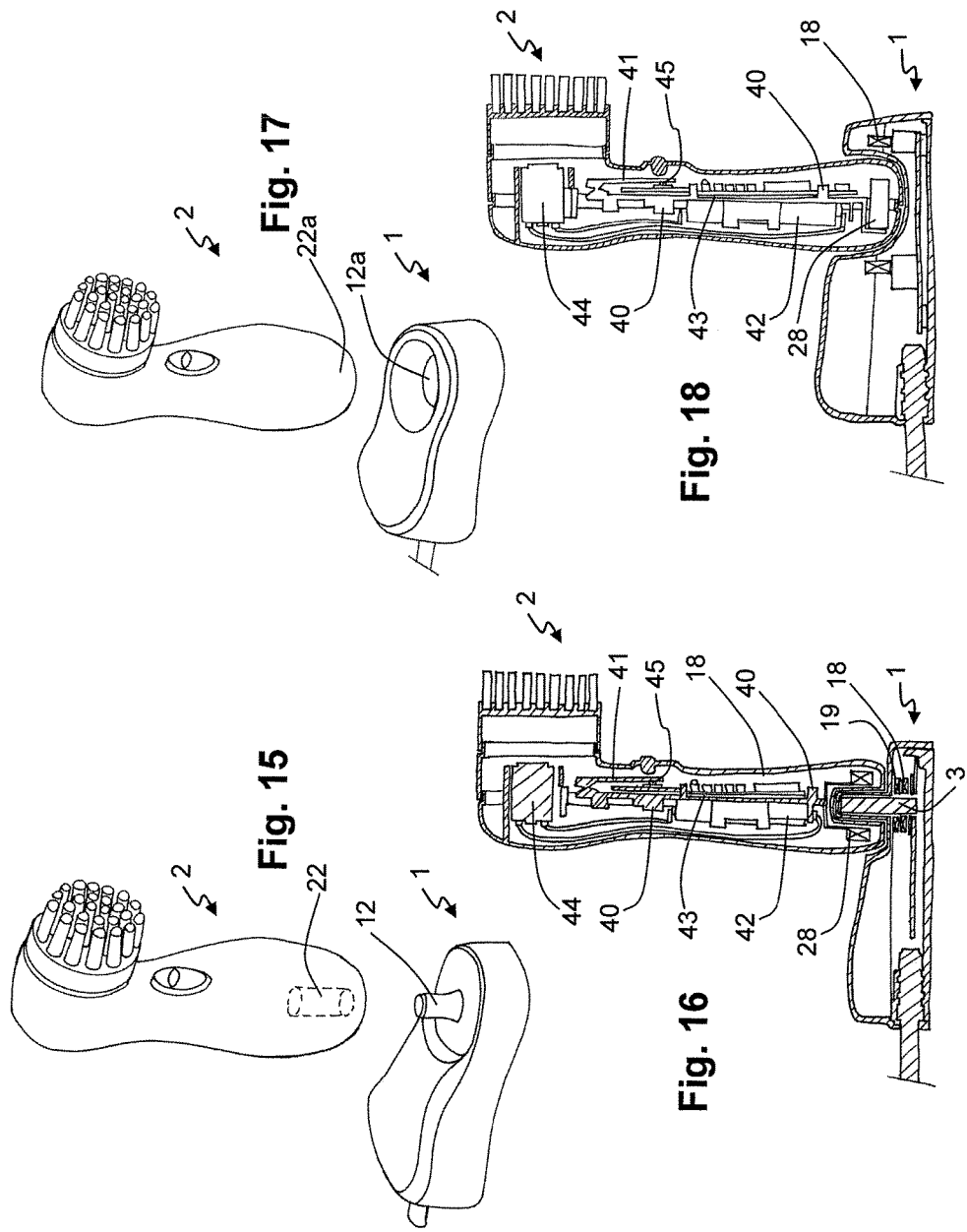

CHARGING DEVICE AND HAND-HELD DEVICE FOR A SMALL MOBILE ELECTRICAL DEVICE

The invention relates to the field of small mobile electrical devices and in particular to the contact-free energy supply of such.

Small mobile electrical devices such as electrical toothbrushes and devices for body care can be designed without a cable, and accordingly comprise batteries which can be charged via a wireless energy supply. For this, a hand-held device (or hand-held part) is placed into or onto a charging device (or charging part), or however even only brought into its spatial proximity, so that an inductive energy transmission from the charging device onto the hand-held device is possible.

EP 2207250 or U.S. Pat. No. 8,319,376 discloses the detection of a loading of an inductive energy transmitter, by way of measuring the voltage across a primary wading of the energy transmitter. An oscillator is intermittently switched on, in order to detect a load. The degree of modulation of a PWM signal for feeding the oscillator is reduced if no load is detected.

US 2010/0177537 discloses a circuit, in which a feedback winding of an energy transmitter charges a turn-off capacitor, for adapting to changing mains voltages. The voltage at the turn-off capacitor controls an oscillation circuit transistor via a turn-off transistor. The higher the input voltage, the more quickly is the turn-off capacitor charged and blocks the oscillation circuit transistor. A too high voltage at the oscillation circuit transistor is avoided by way of this.

US 2002/141208 describes a circuit, in which a feedback winding of an energy transmitter charges a capacitor which is connected to a control input of a switch of an oscillation circuit. The interaction of these elements is not described in detail, but according to one example should reduce a primary current and a primary voltage if no load is present at the secondary side.

US 2008/205919 shows a charging station and a cordless telephone, wherein the cordless telephone can be inductively charged. A current or a voltage in the primary oscillation circuit is measured via a measuring resistor, and the supply of the primary oscillation circuit is interrupted in accordance with this measurement. The supply is only continued if the current lies above a certain limit value. A metallic foreign body is deduced as being located in the charging station if the current lies within a certain band below this limit value. The primary oscillation circuit can then be fed in an intermittent manner, in order to ascertain as to whether a hand-held device or a metallic foreign body or not is located in the charging station.

US 2012/112543 describes a charging station for a mobile device. The mobile device can actively wake up from a standby mode, by way of the mobile device inducing a current in the charging station. A detection circuit recognises this current and wakes the charging station.

US 2012/313579 shows a method for ascertaining, as to whether a metallic foreign body is located in the active region of an inductive energy transmitter.

U.S. Pat. No. 7,933,870 describes the detection of a load at an inductive energy transmitter, by way of measuring the self-inductance at the primary side.

EP 2441155 A1 shows a mains adapter with an inductive transmission of energy, with several operating states in dependence on a load. The load is determined by way of an electrical variable occurring in an oscillator. An output of the mains adapter is grounded across a small resistor in a standby mode, and the supply voltage of the oscillator changes by way of this.

EP 0758153 B1 describes a small transformer. A signal corresponding to the saturation of the transformer is detected via a primary-side additional winding, in order to measure whether a consumer draws power at the transformer. The transformer is switched in a current-free manner at the primary side if no consumer is present. The measurement can be effected periodically, for which if required the transformer is briefly supplied.

EP 1022840 B1 discloses an inductive charging device. A load is differentiated from a metallic interfering object, by way of switching a feed frequency between different values and determining as to whether a co-oscillating load to be charged is present, from the amplitude of the resulting current.

EP 0982831 B1 likewise discloses an inductive charging device. A load identifies itself, by way of the load absorbing energy in high-frequency bursts. In this manner, it is recognisable to the primary side that the load is present.

DE 2652700 A1 and DE 4100272 A1 show charging devices with a transformatory coupling. A power feed is [closed-loop] controlled by way of a voltage which is tapped at an auxiliary winding.

A possible object of the invention is to provide a charging device for a small mobile electrical device, said charging device having a comparatively low energy consumption. It should be noted that the term battery and accumulator are used synonymously in the present application and indicate a rechargeable energy store.

A further possible object is to provide a charging device for a small mobile electrical device, said charging device having an as low as possible energy consumption, in particular given a charged battery of a hand-held device and/or when the hand-held device is not inserted.

A further possible object is to provide a charging device for a small mobile electrical device, said charging device in addition having a simple construction and in particular being able to be realised with discrete components.

A further possible object is to provide a charging device for a small mobile electrical device, said charging device operating with feed voltages of different height and/or being able to be applied in different power networks.

A further possible object is to provide a charging device for a small mobile electrical device, said charging device improving the operability of the hand-held device.

A further object is to provide a hand-held device or hand-held part for a small mobile electrical device, said device or part preventing an undesired discharging of an energy store of the hand-held device when the hand-held device is inserted into the charging device.

A further possible object is to provide a hand-held device for a small mobile electrical device and a method for charging an energy store of a small mobile electrical device, wherein this device and method permit an improved charging of an energy store of the hand-held device, in particular after the energy store has been discharged to a large extent.

A further possible object is to provide a hand-held device for a small mobile electrical device, said hand-held device being able to be charged in a contactless manner and having a long service life.

A further possible object is to provide a hand-held device and/or a charging device for a small mobile electrical device, said hand-held device and charging device being constructed in a simple manner.

At least some of these objects are achieved in each case according to one or more of the subsequent invention aspects.

The mentioned hand-held devices or hand-held parts in particular are devices for dental care or body care, for example toothbrushes, massaging devices, applicators, shavers, skin-cleaning devices, etc.

According to a first aspect of the invention, a charging device for the contactless transmission of energy for the energy supply of a cordless hand-held device, in particular a hand-held device for body care is present. Thereby, the charging device comprises an electronic circuit for feeding an inductive energy transmitter, and the circuit is designed to adapt an energy fed to the inductive energy transmitter, in accordance with energy taken from the inductive energy transmitter.

In one embodiment, the circuit comprises:
- a primary winding for feeding a hand-held device, wherein the primary winding is part of an oscillation circuit,
- a feed circuit for the pulsed feeding of energy into the oscillation circuit, wherein for example the oscillation circuit is fed in a pulsed manner at the oscillation frequency of the oscillation circuit:
- a detection winding which is magnetically coupled to the primary winding; and
- a control circuit which rectifies the voltage at the detection winding, and interrupts or attenuates the pulsed feeding by the feed circuit when this voltage exceeds a threshold value.

The energy consumption of the charging device is reduced by the interruption or temporary reduction of the feeding.

The general manner of functioning of the circuit can be as follows: A flyback converter loads a magnetic field into the primary inductance of the primary winding and therewith on its discharge feeds a capacitor which is placed on the secondary side of a transformer behind a rectifier. Typically, the main part of the power is transmitted to this secondary side. A respective secondary winding must have a good magnetic coupling to the primary winding. An auxiliary winding or detection winding can be present, which on the one hand permits an energy supply of components of the circuit and on the other hand serves as a detector for the transmitted power. Since the energy loaded into the transformer is always the same, during active power consumption of the secondary winding on average less power is transmitted to the auxiliary winding. This power difference can be used for [closed-loop] control. Apart from the charging operation, also two further operating modes can be given:

1. Charging the battery in the hand-held device, for which typically the hand-held device is arranged in a charging position with respect to the charging device. The hand-held device for example is inserted in the charging device or placed or laid onto the charging device, in the charging position;
2. No charging of the battery, wherein the hand-held device is not arranged in the charging position with respect to the charging device;
3. Battery is completely charged in the hand-held device and the hand-held device is in the charging position with respect to the charging device.

These modes can be recognised by the just mentioned power difference. The absorbed input power greatly reduces in the modes 2 and 3. Modes 2 and 3 can be electrically treated as one mode, in particular of no ferrite is integrated in the hand-held device and/or the secondary winding is electrically isolated from the secondary circuit on recognition of mode 3. This coil cannot build up a magnetically opposing field due to this isolation, and is therefore not magnetically active. If no ferrite is integrated in the hand-held device, then the primary and auxiliary inductance also does change not due to the presence or absence of this ferrite.

In an embodiment, the feed circuit and the control circuit are constructed from discrete switching elements. The charging device this comprises no integrated circuits. An inexpensive and simple construction is possible by way of this.

In an embodiment, the control circuit comprises: a rectifier circuit for forming a rectified voltage from the voltage at the detection winding, and an interrupter circuit which, when this rectified voltage exceeds a threshold value, suppresses or attenuates an activation of a switching element feeding the oscillation circuit. The activation can thereby be completely suppressed, so that the oscillation circuit settles according to its attenuation. The activation can also be only partly suppressed, so that the oscillation circuit continues to oscillate at a lower amplitude and reduced energy feed.

In an embodiment, the interrupter circuit intermittently suspends the suppression of the switching element feeding the oscillation circuit and by way of this maintains the oscillation of the oscillation circuit. This is useful if the suppression is complete.

A minimal magnetic alternating field is constantly present, by way of the oscillation circuit continuing to oscillate or the oscillation of the oscillation circuit being maintained by way of intermittent excitation. If a consumer with a secondary winding again gets into the region of the alternating field, then it draws energy from this field, and the feeding of the oscillation circuit is increased again.

The embodiment permits the application amid a large bandwidth of feed voltages, for example between 100 V and 250 V with frequencies in the region of for example 45 Hz to 65 Hz. For example, an increase of the feed voltage leads to a more rapid oscillating-up (oscillation start-up) of the oscillation circuit, which however nevertheless does not lead to an oversupply of the oscillation circuit thanks to the control circuit.

In an embodiment, the interrupter circuit comprises a second switch which is arranged in a manner such that when the rectified voltage of the detection circuit exceeds a threshold value, it pulls down the potential at the base of the switching element feeding the oscillation circuit. A solution which is simple regarding switching technology can be thus realised.

In an embodiment, the circuit comprises:
- a primary winding for feeding a hand-held device, wherein the primary winding is part of an oscillation circuit,
- a driver circuit for the pulsed feeding of energy into the oscillation circuit in accordance with a driver signal,
- a current measuring circuit for producing a current measurement signal corresponding to a current flowing into oscillation circuit,
- a control device which is designed to detect the current measurement signal and, in accordance with the current measurement signal, to generate the driver signal as a pulse-width modulated signal with a frequency corresponding to a resonance frequency of the oscillation circuit, for the activation of the driver circuit.

In an embodiment, the control device is designed to be in a sleep state or in a charging state, in the sleep state to intermittently generate a driver signal during a test time period and thus to feed energy into the oscillation circuit, to test as to whether the current measurement signal thereby exceeds a first threshold value, and if this is the case, to change into the charging state, and if this is not the case, to remain in the sleep state. The energy consumption is reduced according to the time duration between these intermittent tests as well as according to the test time duration.

In an embodiment, the control device is configured, in the charging state, to essentially continuously generate the driver signal, to test whether the current measurement signal thereby falls short of a second threshold value, and to change into the sleep state if this is the case, and to remain in the charging state if this is not the case. The second threshold can be the same as the first threshold value. However, a certain hysteresis is advantageously present, i.e. that the second threshold is lower than the first.

In an embodiment, the current measuring circuit comprises a measuring shunt and a rectifier circuit for rectifying a voltage occurring across the measuring shunt and for generating the current measurement signal. Thereby, the control device can be realised by a microprocessor or microcontroller. The microprocessor or microcontroller optionally comprises an analog input for determining the current measurement signal. Instead of an analog input, a threshold value can also be outputted at an analog output of the microcontroller, and its value compared to the current measurement signal by way of a comparator, for evaluating the current measurement signal.

In an embodiment of the invention, the microprocessor or the microcontroller implements a communication interface, in particular a USB interface. On the other hand, data which has been detected in the charging device, and/or data which has been detected in or by way of the hand-held device and has been transferred to the charging device can be transmitted via this interface to a further device which also provides the USB interface and its power supply. As is common with the USB standard, data can be transferred to the further device concerning the power requirement and the presence of the charging device. A far-reaching independence from standards specific to countries is possible by way of the power supply via a USB interface, and the application of devices of many different manufacturers is possible for feeding the USB interface.

In an embodiment of the invention, the further device, also called supply device, is designed, in order to adapt an operating state in accordance with the power requirement or the presence of the charging device. The supply device for example can comprise a supply unit, which according to the power requirement or the presence of a charging device, is in a feed state, in which the supply device releases power to the charging device, or in a standby or sleep state, in which it releases no power to the charging device.

Information with regard to the presence or a charging state of a hand-held device can thus propagate from the hand-held device to the charging device and from the charging device to the supply device. According to an embodiment, in this way the power absorption of the supply device can also be limited to that which is required.

The supply device can be a mains adapter, in particular a plug mains adapter, thus a mains adapter which is integrated with a wall plug. The mains adapter or supply device can comprise a USB connection for transmitting its power to the charging device and for transmitting information from the charging device to the supply device.

In another embodiment, a USB interface is only used for feeding the device, without a communication according to the USB standard taking place. Also, only an interface with contact elements such as a USB plug or an USB socket can be used, without interface functions in the field of communication according to the USB standard being implemented. Of course, another DC voltage supply can also be applied instead of such a USB connection.

Data which is captured in the charging device, for example is data on the frequency of use—for example under the assumption that the hand-held device is arranged in the charging device when not in use—and/or on the energy consumption and/or on varying operating parameters which permit information concerning the state of the hand-held device (sinking battery capacity and likewise), or also on operating parameters which permit to draw conclusions concerning the condition of the brush heads.

Data which is detected in the hand-held device for example is one or more of:
 pressing pressure or other parameters of an effector, for example of a toothbrush
 application time (cleaning time);
 number of applications in certain time intervals;
 charging state of the battery of the hand-held device;
 cumulative application time and, resulting from this, an indication that the brush would need to be exchanged
 . . .

A communication between the hand-held device and the charging device which is thereby used can be effected by way of infrared interface, via an LED display of the hand-held device, via Bluetooth, WLAN standard or a near-field communication protocol, by way of switching on and switching off the secondary winding in the hand-held device, by way of modulation of a current through the secondary winding, in particular frequency modulation, etc.

Individual ones of these communication paths are evidently also suitable for direct communication with the further device, thus without the detour via the charging device. The further device for example can be a smartphone or a PDA or a tablet computer or another computer.

The communication can either be designed to be unidirectional only from the hand-held device to the charging device, or also bidirectional, i.e. in both directions.

The charging state of the battery of the hand-held device can be transferred as a numerical value via one of the mentioned communication paths. It can also be transferred as a binary signal, by way of a connection to the secondary coil being opened in the hand-held device, given a fully charged battery. For this, the charging current circuit can thus be opened, for example with a semiconductor switch or transistor switch. In this manner, the respective inductive load in the magnetic field is removed, which can be detected in the charging device as already described.

In an embodiment, the charging device comprises a display of the operating state of the hand-held device. This operating state can be the charging state of the battery of the hand-held device (for example "battery charged", "battery being charged", the charging state in percent, display of a low charging state, . . . ) and/or a function status of the hand-held device ("in standby", "being charged"). The operability of the hand-held device is improved with this.

The display can for example be effected by way of different LEDs, coloured LEDs, a display, etc. In particular, LEDs or coloured LEDs or other light means can shine through a translucent base of the charging device.

The displayed operating state can be transmitted by way of one of the mentioned communication paths, or determined by way of a power consumption of the hand-held device.

In an embodiment, the display of the operating state and/or another display on the charging device can be activated only if a presence detector displays a presence of a consumer. A presence detector for example is a motion sensor, a pyro-electrical sensor, a shock sensor, a microphone, etc.

Such another display for example can be a display which signalises to the user that a certain time duration has passed and/or that his teeth should be cleaned.

In an embodiment, the charging device comprises a supply securing circuit which pulls the voltage at a connection point to a reference voltage, wherein the connection point is connected with a communication lead of an interface to a supply device or feeding device, and the charging device is designed to measure a voltage at the connection point and to modify a charging procedure by the charging device in accordance with the measured voltage. This modification for example can include a charging procedure being carried out at full power, reduced power or not at all. The communication lead can be a data lead of a USB interface, thus for example a lead on a contact of a socket or of a plug according to the USB standard, said lead provided for data transmission. If the voltage at this lead is essentially the same as the reference voltage, then one can conclude from this that a connected supply device can communicate according to the USB standard. Moreover, one can conclude from this that such a supply device can only provide power to a limited extent, and thus should only be burdened by the charging device to a limited extent or even not at all. The supply device is protected from overload by way of this. The described supply securing circuit can be applied completely independently of the other aspects and embodiments, generally for devices, with which one can expect that they are connected to a USB connection of a computer.

The charging device can be a charging station, on or into which the hand-held device is applied. The charging device can thereby be a charging unit which can be applied in combination of another article of daily use, such as a water glass or tooth glass, or a charging surface, upon which the hand-held device is applied alone or together with other hand-held device.

A multitude of the methods and devices which are put forward here can also be realised in a context without reference to inductive charging devices.

According to a second aspect of the invention, a hand-held device with a contactless energy supply is present, which comprises
 a secondary winding for the inductive energy transmission from a charging device to the hand-held device,
 an electrical energy store chargeable via the secondary winding,
 a consumer and
 a switching device for the switching on and off the supply of the consumer by the energy store.

The hand-held device moreover comprises a protective circuit which interrupts the supply of the consumer when energy is fed via the secondary winding into the hand-held device. The load is separated from the supply with this. With this, a hand-held device (with a weak battery) which is inadvertently still switched on, is prevented from being inserted into a charging device, with the charging current flowing in the hand-held device in the inserted state flowing through the consumer. As a rule, the charging current is smaller than the current which is normally necessary for operation of the consumer. Thereby, with a discharged battery, the consumer would not recognisably function, despite it being switched on, and after insertion into the charging device would absorb the charging current, without for example recognisably vibrating. In turn, the battery would never become charged on account of this. This error is prevented by way of the described automatic switching-off of the consumer or the interruption of a supply of the consumer, as soon as it is detected that a feeding takes place.

This type of hand-held device can be arbitrarily combined with the different embodiments of charging devices according to the first aspect of the invention and which are described above.

In an embodiment, the hand-held device comprises a switching device for switching the secondary winding on and off. The switching-off can be triggered for example when the battery is full. Additionally or alternatively, information can be transferred to the charging device by way of switching on and off, thus a communication with the charging device can be realised.

In an embodiment, the hand-held device comprises a current measuring device which detects a charging current in a charging [current] circuit of the hand-held device. The protective circuit interrupts the supply of the consumer when the charging current exceeds a threshold. The charging circuit is formed essentially by the secondary winding, one or more rectifier elements and the battery.

According to an embodiment, the current measuring device comprises a measuring rectifier which rectifies a voltage across a measuring element in the charging current circuit and forms a rectified voltage at a measuring capacitor. The protective circuit interrupts the supply of the consumer when this rectified voltage exceeds a threshold. A realisation with discrete components and which is simple with regard to design is possible with this. The measuring element can be the rectifier diode of the charging circuit itself. The measuring element can also be a resistor as a measuring shunt.

In an embodiment of the invention, the hand-held device comprises a mechanical switch which pulls a control input of the switching device to a first potential, for switching on the supply of the consumer. The protective circuit pulls the control input to a second potential when a charging current occurs, and thereby switches off the supply. A particularly simple and purely discrete circuit permitting the use of a mechanical on/off switch on the hand-held device is realised with this.

In an embodiment, the hand-held device comprises an integrated circuit with a measuring input, wherein the integrated circuit is configured to switch off the consumer should a voltage at the measuring input exceed a first threshold value. With this, the mentioned principle of the recognition of a feeding and the automatic load switch-off can also be realised in combination with a microcontroller.

In an embodiment, the integrated circuit is configured to process the voltage at the measuring input as the battery voltage, when it falls short of a second threshold value. The circuit then therefore interprets this voltage as a battery voltage, and triggers corresponding signals or steps depending on the magnitude of the battery voltage. For example, the circuit can display a charging state of the electric energy store to a user via display means, in accordance with the battery voltage. Alternatively or additionally, it can transmit the charging state to the charging device and/or to a further device, via a communication means, as already mentioned for example.

The second threshold value can lie below the first threshold value. The second threshold value however, as a rule is equal to the first threshold value.

With this, it is possible to realise the measurements for these two functions "battery charging state" and "recognition of a feed and load switch-off" with a single input of the integrated circuit.

In an embodiment, the hand-held device comprises a battery voltage measuring resistor which pulls the voltage at the measuring capacitor to the battery voltage. With this, the voltage at the measuring input is equal to the battery voltage when no charging current flows, which is to say the charging circuit is not fed.

According to a third aspect of the invention, a hand-held device with a contactless energy supply is present, which comprises a secondary winding for the inductive energy transmission from a charging device to the hand-held device, and a battery. The battery is chargeable via the secondary winding. Thereby, the secondary winding is arranged on a hand-held device coil body. The hand-held device coil body comprises a support section which is integrally formed as one piece. The support section is elastically deformable. The hand-held device coil body with its support section presses against the battery in the operationally ready condition of the hand-held device. For example, it presses with a force essentially in the longitudinal direction of the hand-held device. It realises a resilient fixation of the battery by way of this. The necessity for a pressing spring or other elastic elements for the secure contacting of the battery is done away with on account of this. Tolerances in the manufacture of the housing, battery and further elements are compensated by the compliance of the support section. The design and assembly of the hand-held device are simplified.

The different, already described aspects of the invention can be combined with one another in each case. They can also be combined with the embodiments described hereinafter.

According to an embodiment, the hand-held device housing comprises two shells of plastic which are connected to one another by way of ultrasound welding. A welding seam for this can extend essentially along a longitudinal direction of the hand-held device. On manufacture of the hand-held device, electronics and the charging coil of the hand-held device, as well as a motor of the hand-held device (optionally with an eccentric for producing vibration) can be assembled in a head part of the hand-held device, in each case on one of the two shells (clicked in, snapped, etc.). The second shell is placed onto the first and is welded by way of ultrasound. This is in contrast to a hand-held device such as a toothbrush, with which the complete inner workings are pushed into a tube-like hand-held device housing, and the hand-held device housing is then closed by the cover.

According to an embodiment, the charging device with a shaping on the charging device housing forms a pit for holding the hand-held device. The hand-held device thereby in the charging device stands in a position, in which it could not stand without its holding in the pit of the charging device. The hand-held device thus has no base surface, on which it could stand in a stable manner. Instead of a peg which is shaped out on the charging device housing and moves into a corresponding opening of the hand-held device housing, the hand-held device according to this embodiment is held as a whole in the pit of the charging device housing.

According to an embodiment, the coils with the secondary winding each have an axis which runs essentially normally to a longitudinal axis of the hand-held device, in particular normally to a longitudinal axis of a grip section of the hand-held device. The axis of a winding is that geometric axis, about which the windings are wound. The grip section is a section which is provided for gripping and holding the hand-held device by the hand of the user. This alignment of the coil axis is in contrast to embodiments in which the axes of the secondary winding are parallel to the longitudinal axis or coincide with it. It is then useful that the hand-held device can be placed into the charging device in only one direction or orientation, since otherwise no correct charging takes place.

According to an embodiment, axes of the primary windings and secondary windings run essentially horizontally, assuming that the charging device is placed on a level surface in accordance with the designated use of the device. Thereby, one or more primary windings as well as secondary windings can be arranged laterally of the hand-held device or its grip section.

According to an embodiment, the secondary windings are arranged on a rear side of the hand-held device, and the one or more primary windings are a placed at a corresponding location in the charging part. The rear side as a rule is that side which lies opposite an effector of the hand-held device. The effector can be brush, a massage element, an applicator, a cutting device etc. A low construction manner of the charging part is possible with this, and the primary winding can be arranged directly on a printed circuit board of the charging device.

According to an embodiment, the secondary winding is attached on a common carrier element, hereinafter called battery holder, and not on shells of the hand-held device housing. The battery holder can thereby form a subassembly for the battery, electronics and coil. The battery holder itself can be designed as a printed circuit board. The motor can be connected on the battery holder or the printed circuit board via cable. The positioning of the secondary winding within the hand-held device can then be effected via the battery holder. This holder in turn can be aligned within the shells on preferably single-piece shapings of the shells of the hand-held device housing, so that the coils of the charging device and of the hand-held device are aligned to one another as much as possible. A preassembly of the battery holder together with the motor is possible with this.

According to an embodiment, the coil is thereby held on the battery holder by way of clamping, locking-in or snapping-in elements. A simple assembly is possible with this. The secondary winding can additionally or alternatively be bonded onto the battery holder or it can be fastened by an adhesive strip.

According to an embodiment, the battery holder is a carrier for differing electrical and/or electronic and/or mechanical parts. The battery carrier can be designed such that different types of switches, with different construction heights, can be arranged or assembled and be used on it. LEDs could likewise be integrated in the printed circuit board, and the battery carrier is not in the way of the LEDs illuminating through onto the shells of the housing.

In an embodiment of the invention, the battery or several batteries are each held on the battery carrier with suitable holding elements with a locking-in or clamping holding, thus for example snapped in or clicked in. The holding elements for example protect against falling out in the case of lateral impacts. Connection contacts and/or abutments in the longitudinal direction of the battery or batteries can be realised at the two ends of the battery (at the front and rear) and protect from impacts in the longitudinal direction.

According to an embodiment, one succeeds in the hand-held device being able to be placed into the charging device in only a single position, due to the geometric design of the geometry of the charging device housing and the hand-held device housing. This, with certain variants of the invention, prevents the hand-held device for example being inserted into the charging device in a manner rotated by 180° and then not being able to be charged. Thereby, in particular one should take care that the two coils lie as closely as possible to one another—i.e. projecting and distance-creating means are arranged at the side which is opposite to the coil.

Further aspects, which in particular relate to the fixation and assembly of inner components in the housing of the hand-held device, are described hereinafter. The hand-held device is mostly constructed in a multi-part manner, and in the present case a front as well as a rear shell can be present, which after assembly of the inner components are joined together and connected, for example by way of welding, bonding or by way of mechanical locking.

The battery carrier can be a carrier of different electric, electronic and, as the case may be, mechanical components. It can be a plastic part of a hard plastic such as polyoxymethylene (POM) or polypropylene (PP). The following components for example can be attached on the battery carrier:
- printed circuit board
- battery
- coil
- electrical connections The battery carrier can be designed geometrically such that it is arranged in the hand-held device in a fixed manner and in an unambiguous position. Different means can be designed for this, and these can be present alone or in a combined manner:
- Centring means: They are designed such that the battery carrier obtains an unambiguous position with respect to two axes. Cylindrical projections for example are formed on the housing, and recesses with an opposite and equal shape are formed on the battery carrier for this. Move-in aids such as run-in chamfers can be realised on the parts on the battery carrier as well as on the housing, so that the assembly can be more simply accomplished. Two centring means can be realised for the optimal positioning.
- Spacers: As projecting elements, they are either realised on the battery carrier or on the housing. They limit the movement in a further dimension which is still possible due to the centring means. In this context, they are designed as abutment means. Preferably, three to ten spacers are formed in a typical hand-held device for body care.
- Snap means: These are again formed on the housing or on the battery carrier and ensure that the position defined by the spacers is kept to. The snapping-in is effected when position is reached. The snapping can be reversible or irreversible. For example three to eight snap means can be used in total.

As a rule, the three means interact. On assembly, the battery carrier is moved onto the housing via the centring means, until the battery carrier is present at the spacer, and the snap means subsequently act. The battery carrier is thus positioned in a fixed and defined manner.

The battery carrier can comprise further specific characteristics:
- Coil holder. This can be shaped as part of the battery carrier, i.e. the coil is attached onto the battery carrier. The coil holder on the battery carrier is designed with a particularly light spring mounting, so that it is present on the outer wall when the hand-held device is closed or when the battery carrier is assembled in the hand-held device. By way of this, one succeeds in the coil not coming into interplay between touching and not touching the outer wall due to vibrations which arise on operation as the case may be, and would lead to acoustically annoying noises.
- Switch pressing aid: The switch or push-button for switching the hand-held device on or off can be actuated from outside the housing by way of pressure upon a soft-elastic membrane. The switch pressing aid can be formed on the battery carrier since this pressure with regard to the position is not always unambiguously defined, and the switch requires very accurate actions. On account of this, the switch pressing aid is actuated given a pressure upon the soft-elastic membrane, and this switch pressing aid subsequently presses upon the switch in a very accurate manner. The switch pressing aid can thereby be designed as a projecting plastic part—in particular as an arm, which is resiliently movable and has an idle position somewhat above the switch. The pressure can act through the membrane upon any location of the arm (within limits) due to the shaping as an arm, and despite this the pressure is transmitted onto the switch or push-button in a positionally accurate manner.

In an embodiment, a motor and an eccentric which is driven by this are arranged as follows: The motor is held or fixed in the correct position by way of the geometry of the shells of the hand-held device housing. The motor thereby can move with a defined scope, so that vibrations are not directly transmitted onto the hand-held device housing. Thereby, abutments which prevent too large a deflection out of the idle position are formed for example on a rear (lying opposite an effector) shell. The motor is arranged essentially or completely in a tube-like element or tube, which is directly connected to the shell and permits the transmission of oscillations onto an effectors or applicator head and simultaneously minimises the vibration of the hand-held device. This tube in turn can be flexibly mounted.

According to a fourth aspect of the invention, a hand-held device with a contactless energy supply is present, and comprises: a control unit, a battery, a battery voltage measurement for measuring a battery voltage, a detection circuit for detecting as to whether the hand-held device is suppliable with energy by a charging part, and an isolating circuit, by which a charging of the battery can be interrupted, wherein the control device is designed,
- in the case that the battery voltage has fallen short of a minimum value, for example by way of a minimum voltage for operation of the control unit having been fallen short of, to carry out the charging of the battery during a defined minimum charging time, irrespective of the battery voltage.

The charging procedure is prevented from being finished too early by way of this—in comparison to a circuit which only measures the battery voltage and interrupts the charging procedure on reaching a threshold value. This for example can be due to a high internal resistance of the only weakly charged battery.

A charging time is thereby incremented only during time windows in which the charging of the battery takes place.

In the corresponding method for charging an energy store or battery of a small mobile electrical device, the charging of the energy store is thus carried out during a defined minimum charging time irrespective of the battery voltage, in the case that the battery voltage of the energy store has fallen short of a minimum value.

In an embodiment of the fourth aspect, the control unit is designed,
- to resume the charging of the battery, until the minimum charging time is reached, in the case that the charging of the battery is interrupted before reaching the minimum charging time, and the hand-held device is subsequently again suppliable with energy by the charging part.

In an embodiment of the fourth aspect, the control unit is designed, after the minimum charging time has been reached and the hand-held device continues to be suppliable with energy by the charging part, to resume the charging of the battery, in the case that the battery voltage falls short of a lower threshold value.

In an embodiment of the fourth aspect, the control unit is designed, to again interrupt the charging of the battery, in the case that the battery voltage exceeds an upper threshold value.

According to a fifth aspect of the invention, a hand-held device with a contactless energy supply is present, which comprises a secondary winding for the inductive energy transmission from a charging device to the hand-held device, an electric energy store which can be charged via the secondary winding, a consumer and a switching device for switching on and switching off the supply of the consumer by the energy store, a hand-held device housing with a removable closure part, in particular a base, wherein the energy store can be exchanged given a removed closure part, and wherein the secondary winding is arranged on the removable closure part.

With this, it is possible to exchange the energy store, for example if a battery has reached its service life and must be replaced. The service life of the hand-held device can be extended with this. The secondary winding for example is fixedly connected to the closure part and together with the closure part can be removed from the remaining hand-held device housing.

In a first embodiment of the fifth aspect, a ferrite core is arranged on the removable closure part, in particular concentrically to the secondary winding, for example as a cylindrical core as a pot core.

In a second embodiment of the fifth aspect, which can be combined with one of the preceding embodiments, the hand-held device housing comprises: contact element pairs for creating a releasable electrical connection between the secondary winding and a secondary circuit which is fed by the secondary winding and which is arranged in the remaining hand-held device housing. In particular, two such contact element pairs can be present.

With this, it is possible for the secondary winding to be decoupled from the secondary circuit in particular in a two-poled manner, and to completely remove the closure part from the remaining hand-held device housing. A cable connection can be present between the closure part and the remaining hand-held device housing, alternatively to such a releasable electric connection.

In a third embodiment of the fifth aspect, which can be combined with one of the preceding embodiments, the closure part comprises at least one energy store contacting element for contacting an electric connection of an energy store inserted into the hand-held device. Thereby, the hand-held device housing can comprise a third contact element pair for creating a releasable electric connection between the mentioned energy store contacting element and the secondary circuit.

In a fourth embodiment of the fifth aspect, which can be combined with one of the preceding embodiments, the closure part is releasably connected to the remaining hand-held device housing by a bayonet closure. Alternatively, the closure part can be releasably connected to the remaining hand-held device housing by a screw connection or by several screws. The closure part can alternatively be connected to the remaining hand-held device housing by a snapping-in and re-releasable plug-in connection.

In the fifth embodiment of the fifth aspect, which can be combined with one of the preceding embodiments, the closure part is releasably connected to the remaining hand-held device housing by way of a bayonet closure, and elements which mechanically contribute to the function of the bayonet closure are also designed as electrical contact elements.

In a sixth embodiment of the fifth aspect, which can be combined with one of the preceding embodiments, a resilient element for creating a mechanical biasing between the energy store contacting elements and electrical connections of an energy store inserted into the hand-held device, is present on the closure part and/or on the remaining hand-held device housing, for the electric contacting of these electric connections.

According to a sixth aspect of the invention, a hand-held device with a contactless energy supply is present, which comprises:

a secondary winding for the inductive energy transmission from a charging device to the hand-held device, an electric energy store which can be charged via the secondary winding, a consumer and a switching device for the switching-on and switching-off of the supply of the consumer by the energy store, a hand-held device housing with a removable closure part, in particular a base, wherein the energy store can be exchanged given a removed closure part, and wherein the secondary winding is arranged in the hand-held device housing.

With this, it is possible to exchange the energy store, for example if a battery has reached the end of its service life and must be replaced. The service life of the hand-held device can be extended with this. The secondary winding in a special design is connected directly to the further elements.

In a first embodiment of the sixth aspect, a ferrite core is arranged on the removable closure part, in particular concentrically to the secondary winding, for example as a cylindrical core or pot core.

In a second embodiment of the sixth aspect, which can be combined with one of the preceding embodiments, the closure part comprises an energy store contacting element for contacting an electric connection of an energy store inserted in the hand-held device. Thereby, the hand-held device housing can comprise a contact element pair for creating a releasable electric connection between the mentioned energy store contacting element and the secondary circuit.

In a third embodiment of the sixth aspect, which can be combined with one or both of the preceding embodiments, the closure part is releasably connected to the remaining hand-held device housing by a bayonet closure. Alternatively, the closure part can be connected to the remaining hand-held device housing in a releasable manner by a screw connection or with several screws. The closure part can alternatively be connected to the remaining hand-held device housing by a snapping-in and re-releasable plug-in connection.

In the fourth embodiment of the sixth aspect, which can be combined with one of the preceding embodiments, the closure part is releasably connected to the remaining hand-held device housing by way of a bayonet closure, and elements which mechanically contribute to the function of the bayonet closure are also designed as electrical contact elements.

In a fifth embodiment of the sixth aspect, which can be combined with one of the preceding embodiments, a resilient element for creating a mechanical biasing between the energy store contacting elements and electrical connections of an energy store inserted into the hand-held device is present on the closure part and/or on the remaining hand-held device housing, for the electric contacting of these electric connections.

Further preferred embodiments are to be deduced from the dependent patent claims.

Figure 3:
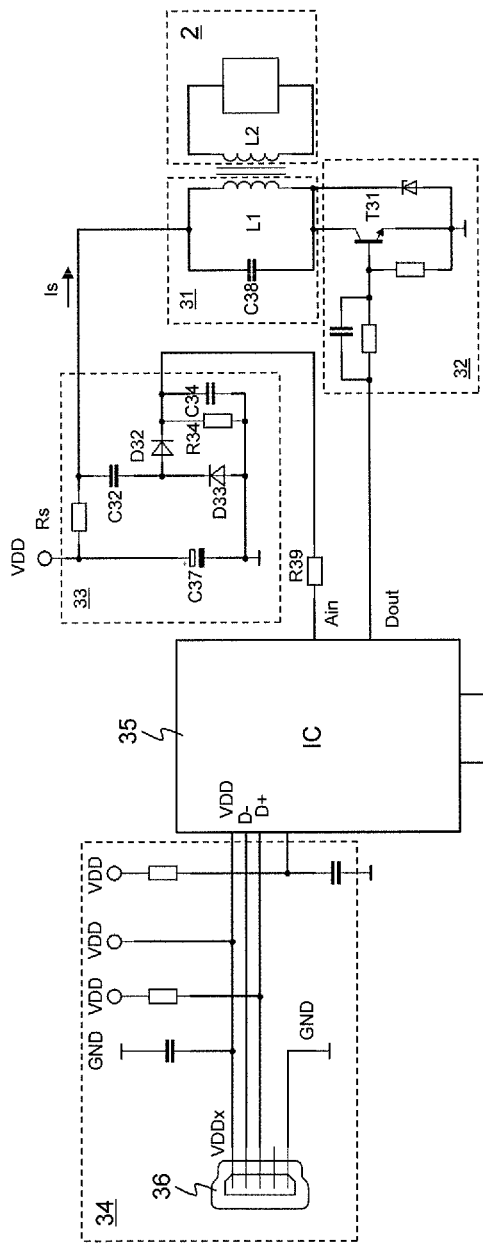
Figure 5:
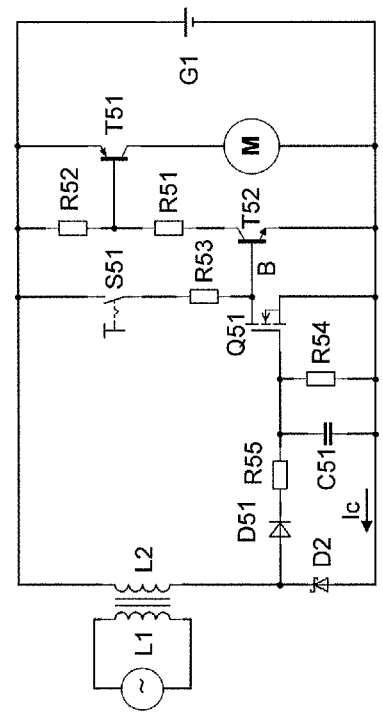
Figure 4:
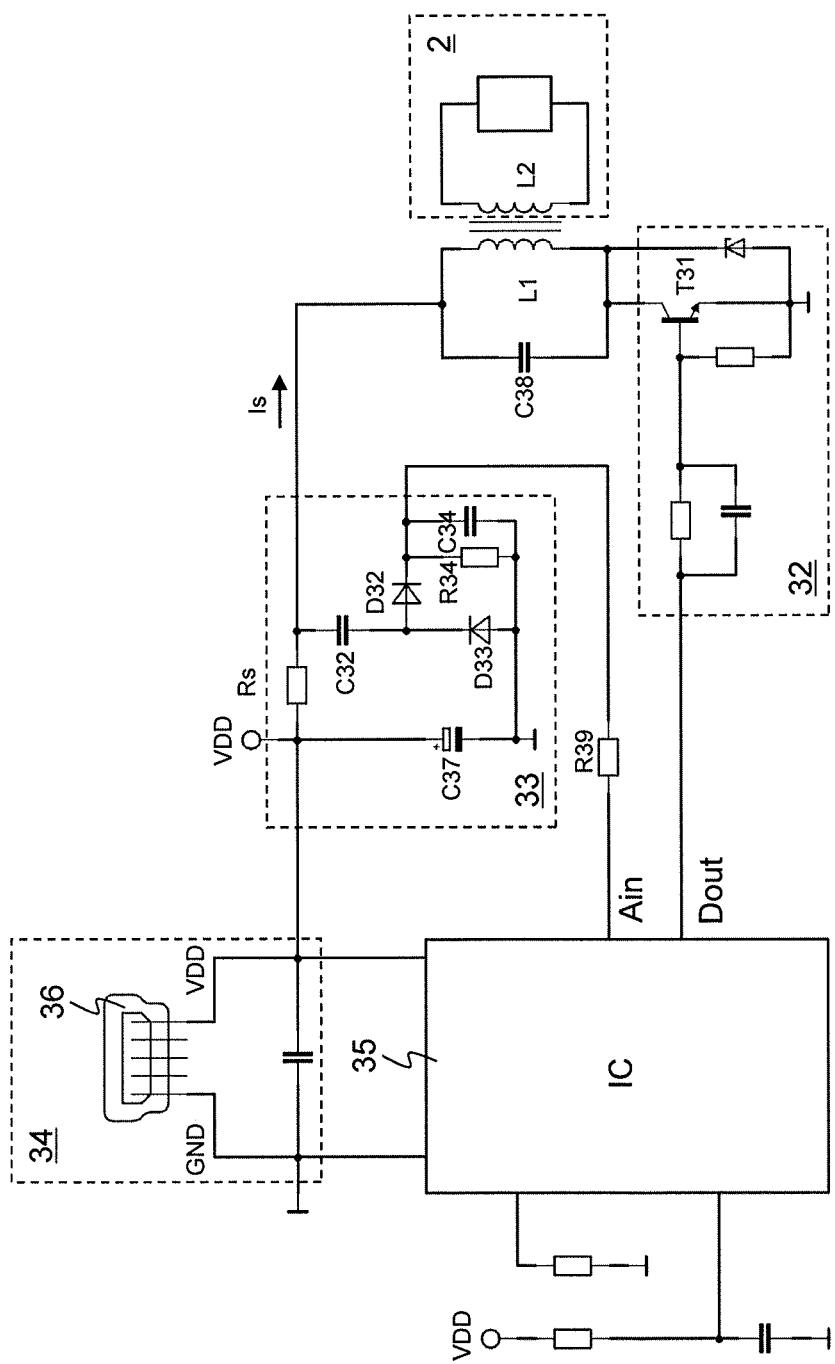
Figure 6:
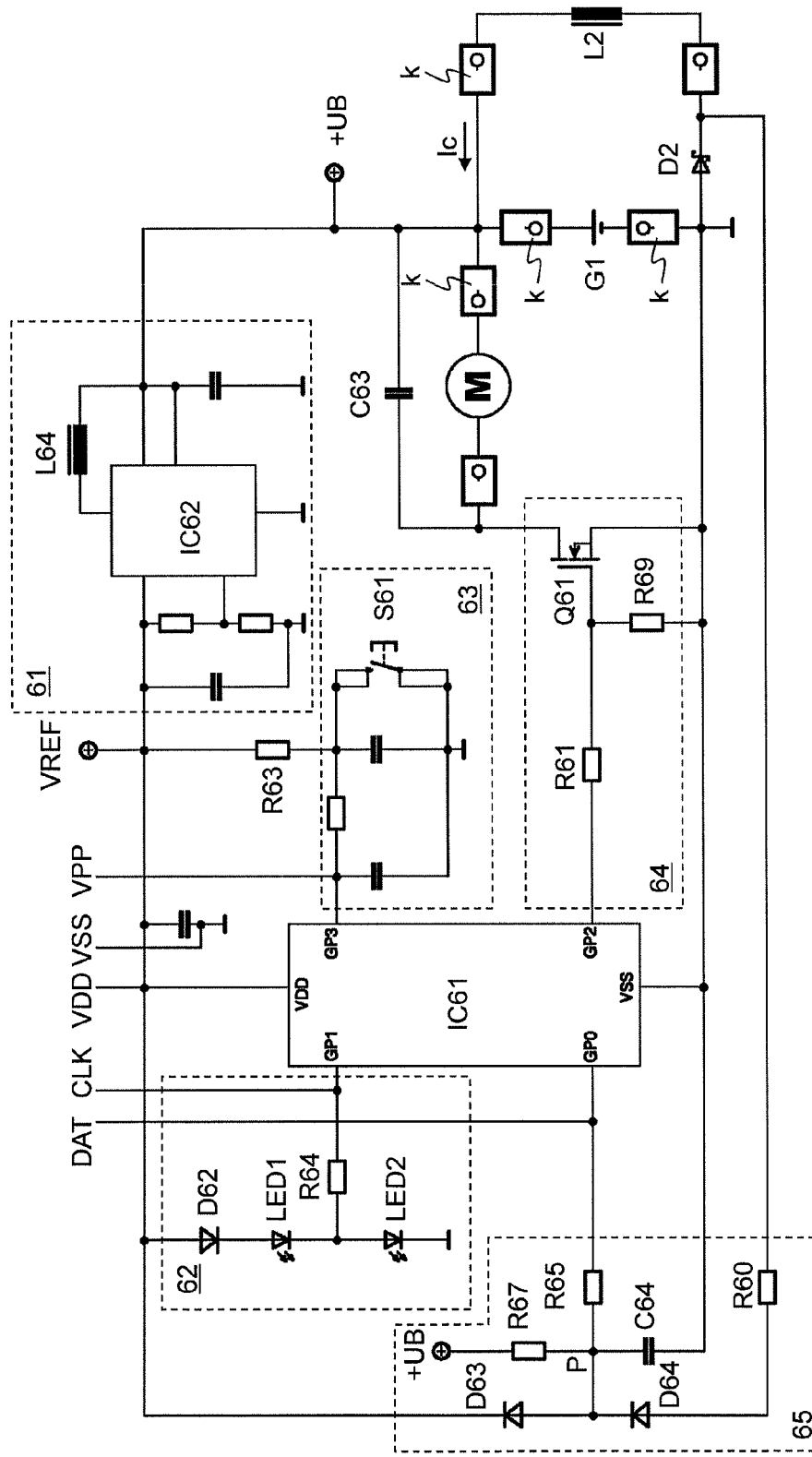
Figure 19:
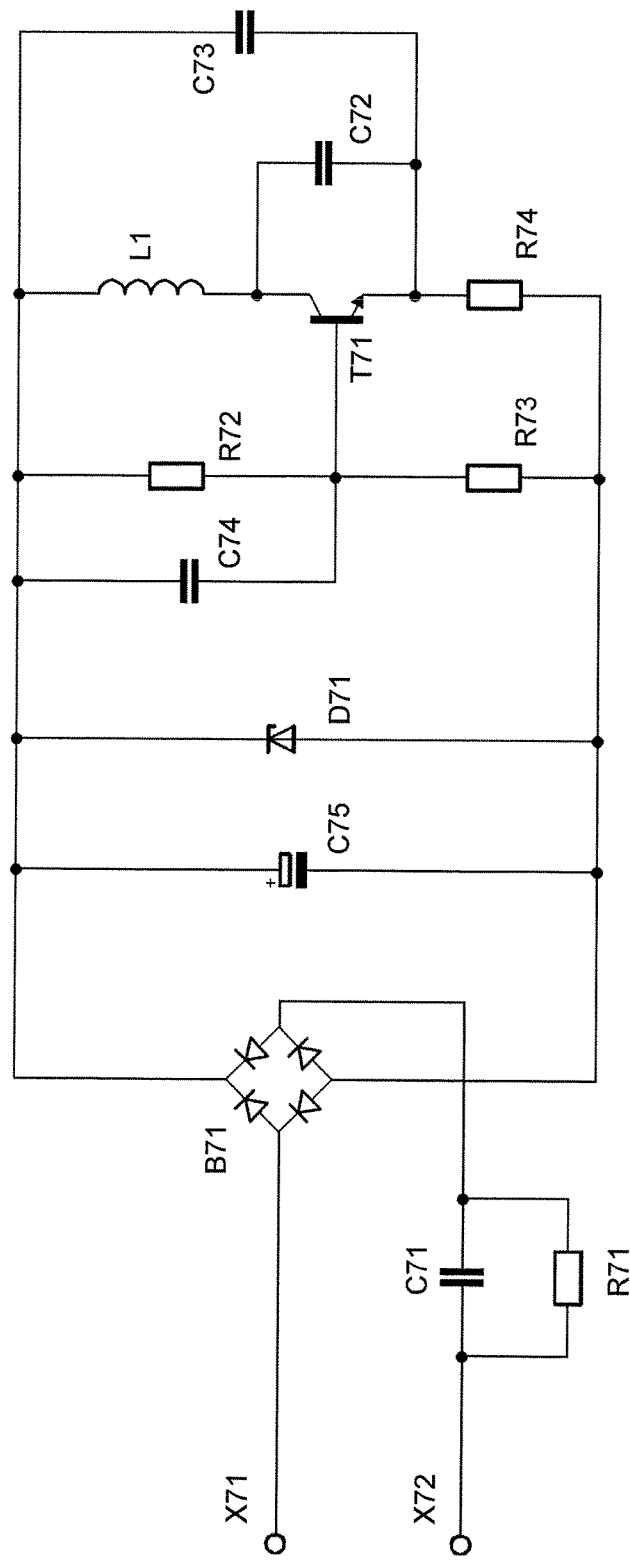
Figure 20:
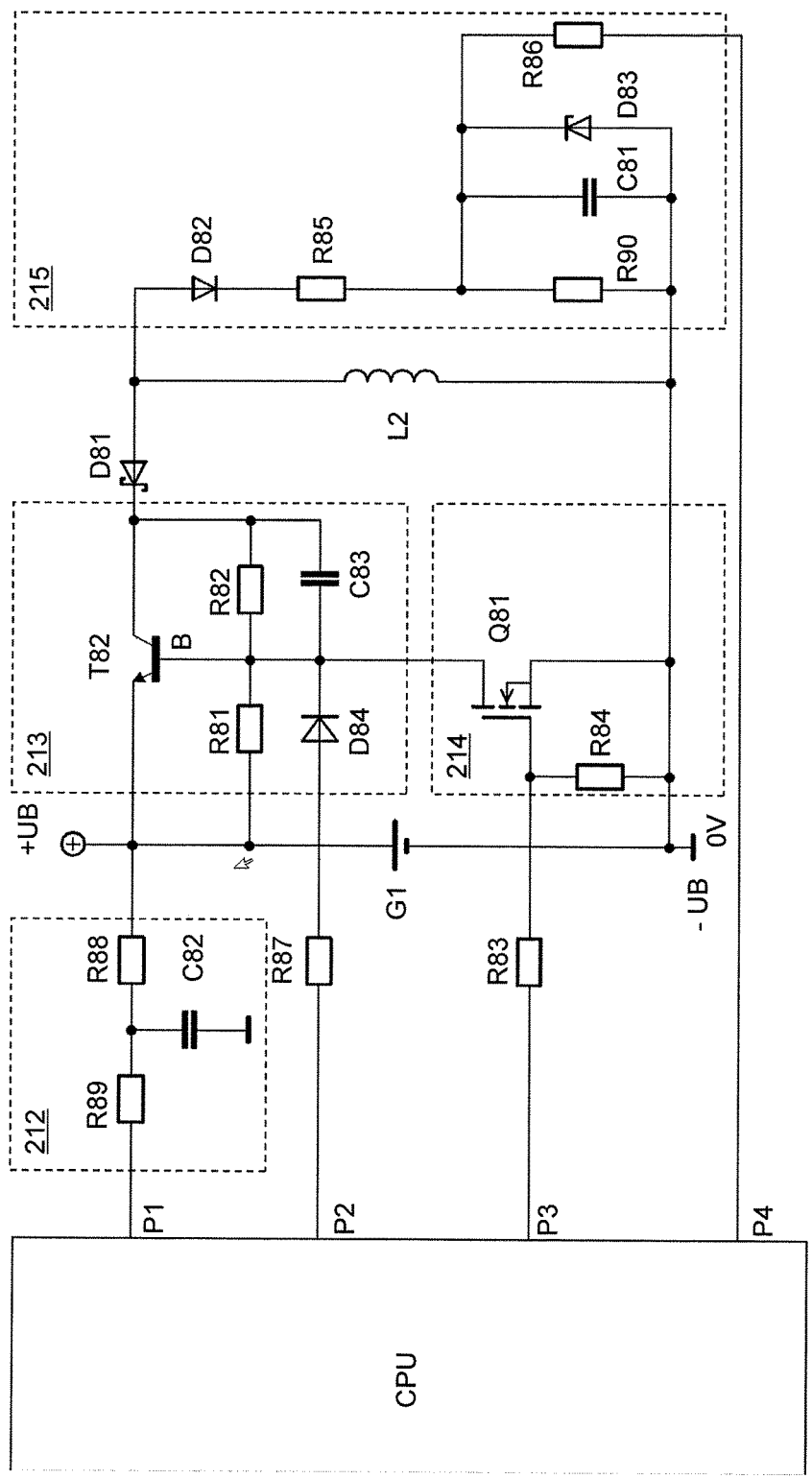

The subject-matter of the invention is explained in more detail hereinafter by way of preferred embodiment examples which are represented in the accompanying drawings. In each case there is shown schematically in:

FIG. 1 a circuit for a charging device;

FIGS. 2a-e temporal courses of variables on operation of the circuit from FIG. 1;

FIGS. 3-4 further circuits for a charging device;

FIGS. 5-6 circuits for a hand-held device;

FIGS. 7-9 views of a charging device with an inserted hand-held device;

FIG. 10 a horizontal cross section through a charging device with an inserted hand-held device, in the foot region of the hand-held device;

FIG. 11 a corresponding vertical cross section;

FIG. 12 a perspective view of a charging device;

FIGS. 13-14 views of a base of a hand-held device;

FIGS. 15-18 views and sections of further hand-held devices;

FIG. 19 a further circuit for a charging device;

FIG. 20 a further circuit for a hand-held device; and

Figure 21A:
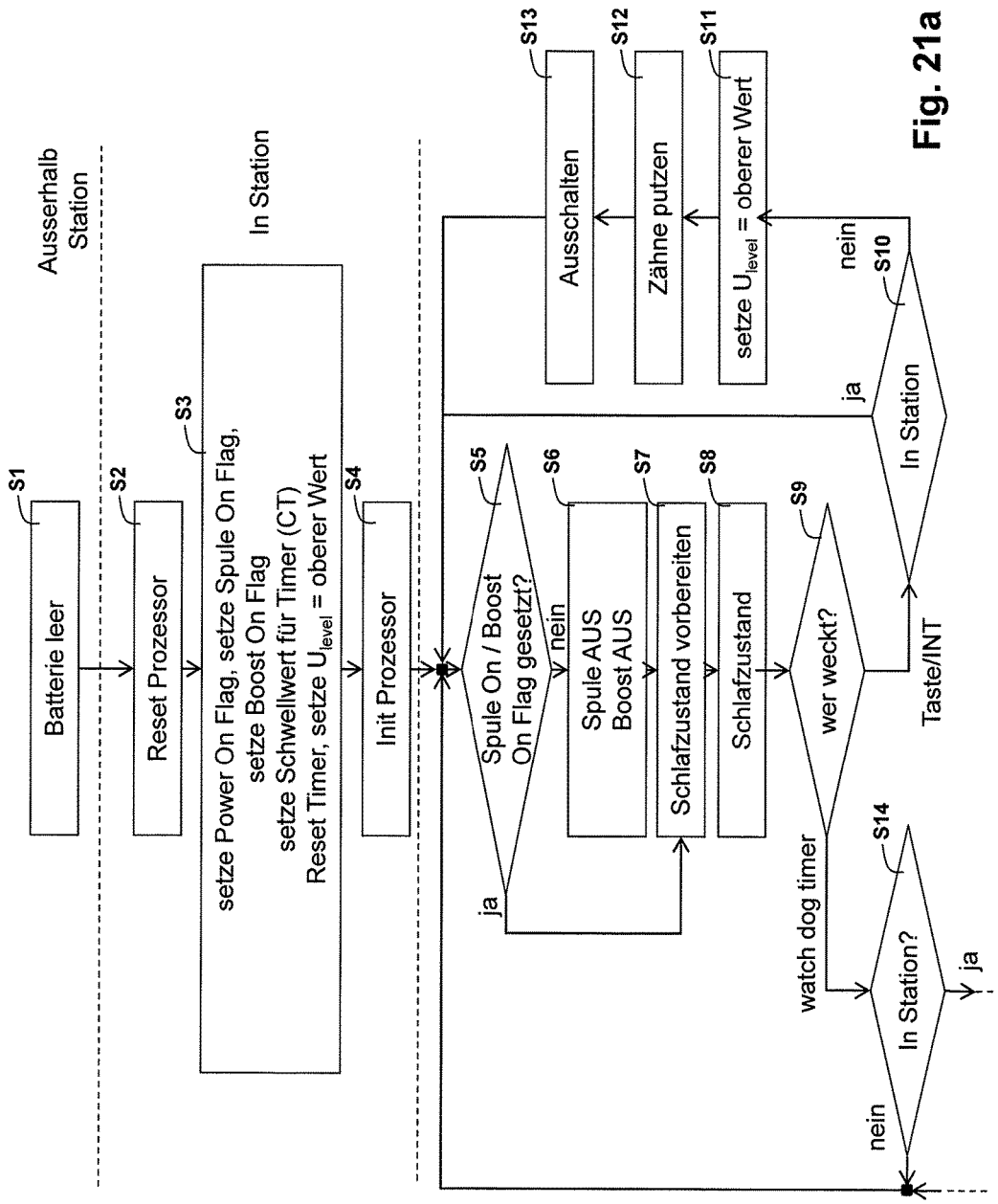
Figure 21B:
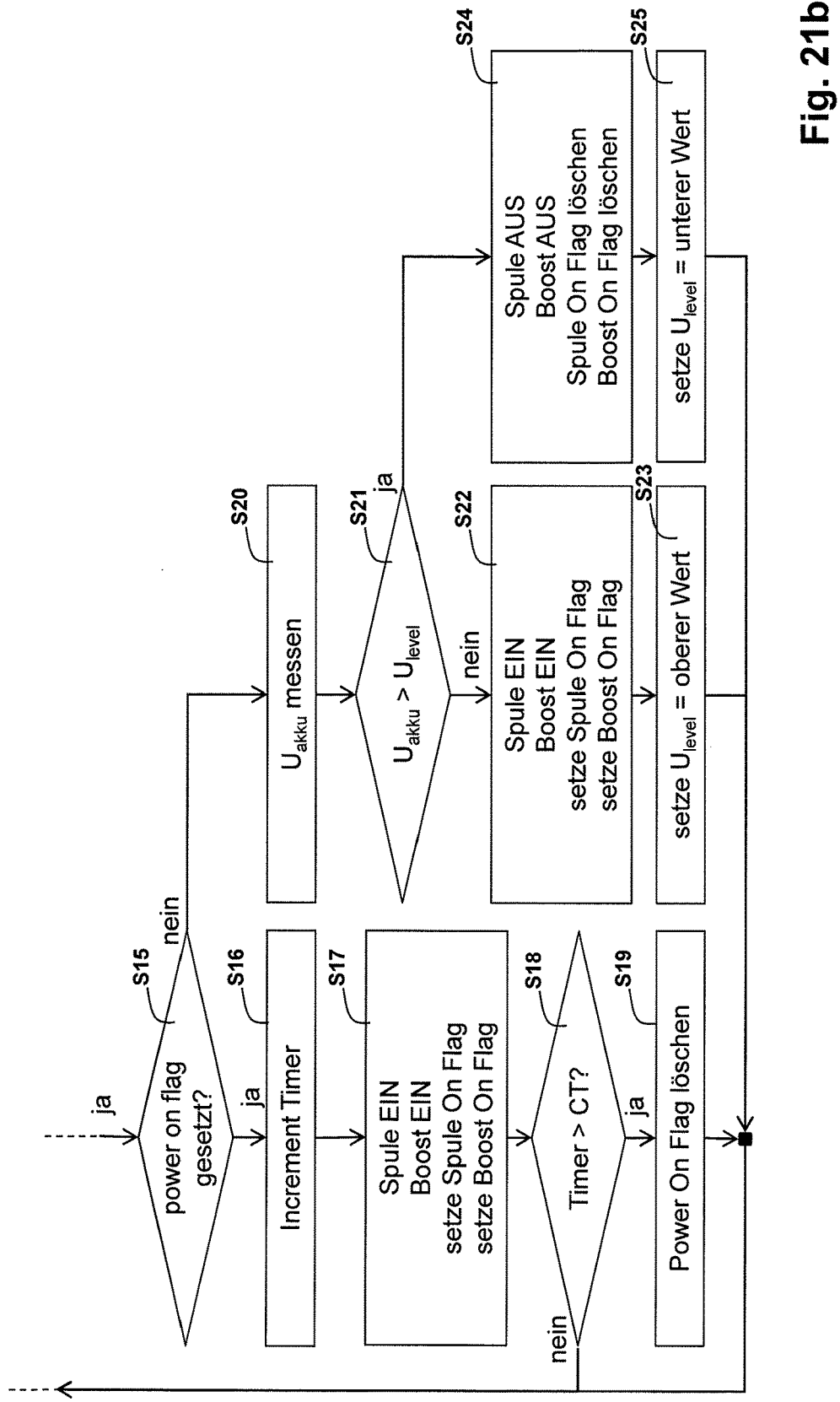

FIG. 21a-21b a flow diagram for a method for energy management.

The same elements or ones acting in the same manner are indicated in the figures with the same reference numerals. The described embodiment examples are exemplary for the subject-matter of the invention and have no limiting effect.

FIG. 1 shows a first circuit variant. The circuit comprises an oscillation circuit L1, C6 with a primary winding L1 for transmitting a power to a hand-held device or a hand-held part which are not drawn here, and moreover a detection winding L3 which is magnetically coupled to the primary winding L1, in a feedback loop, for recognising a load. By way of the feedback loop, it is ensured that the absorbed power is reduced in the absence of a load in the magnetic circuit, in the form of a small mobile electrical device, and the device is brought into a standby mode which reduces the power consumption.

The circuit can be fed with alternating voltages between for example 100 V and 250 V, for example at frequencies in the region of 45 Hz to 65 Hz, at terminals S1, S2. The circuit is protected from overvoltage and overcurrent (surge and burst) which is to say is isolated from the mains in the case of error, with the help of a varistor RV1 and a fuse F1 or with the help of a fuse resistance with a thermal fuse. Two diodes D1, D2 and a capacitor C1 serve as a rectifier for a mains voltage present as an alternating voltage. The second of the two diodes D1, D2 moreover serves as an EMV measure, in order to weaken common-mode interference. An inrush current during startup as well when re-charging during operation is limited by way of a series resistor R13. The power transmission is effected by way of a magnetically coupled oscillation circuit consisting of a series connection of a primary winding L1 and an oscillation circuit capacitor C6. A diode D3 protects Q1 from overvoltage at the connection point of R1 and C2. A further capacitor C2 at the moment of switching-on serves for the full input voltage being present at R1, and the transistor Q1 remaining blocked by way of this, and the oscillation circuit only starting up with a delay and with certain voltage potentials. Moreover, C2 together with C6 serves as a capacitive voltage divider which ensures that a part of the alternating oscillation circuit voltage which is fixed by the capacitance values is present at C2. C2 is moreover subjected to a DC offset voltage by the parallel connection of C1 in series with R1. A mixed voltage at R1 which results by way of this now serves for the [closed-loop] control of the amplification or the supply of the oscillation circuit with energy through a primary transistor or transistor Q1. The collector-emitter path of the primary transistor Q1 opens as soon as the superimposed voltages at R1 drop below the difference of the voltage at the base of Q1 and D3, said latter voltage being fixedly defined by the input voltage and a voltage divider R2, R3, R4 and R6. This is the case when the current through the primary winding L1 just flows in the same direction as the primary transistor Q1 with its collector-emitter path can also amplify this current. The amplification of the transistor is quasi maximal for alternating voltages due to capacitor C3. This leads to the energy feed being effected in a pulse-like manner and only being limited by the inductor L1 as well as the voltage negative feedback by R1.

A positive feedback of the further oscillating-up (starting-up oscillation) and by way of this, the increasing flow of energy is now subjected to negative feedback by the detection winding L3. Basically, no feed of energy takes place when the second transistor Q2 is conducting and the primary transistor Q1 continuously blocks by way of this. The voltage which is proportional to the voltage at L1 via the winding ratio occurs at the detection winding L3 which is magnetically well coupled to the primary winding L1 (since a load is hardly present here). The voltage at the detection winding L3 is rectified by a diode D4 and is stored by a capacitor C5. As soon as the peak value of the voltage at the detection winding L3 increases above the voltage of a rectifier diode D4 and of a Zener diode D6 and a voltage activating the second transistor Q2 has built up at R9, the further oscillating-up of the voltage by further energy feed to the primary transistor Q1 is prevented, since the base potential of Q1 is reduced. A delayed reaction of the detection circuit ensures that this condition remains for some time. The energy and thus the voltage in the oscillation circuit are reduced by attenuating during this time due to a damping resistor R7 in the oscillation circuit. As a result, the voltage at the detection winding L3 also drops, the second transistor Q2 blocks again with the mentioned delay, and the continuous blocking of the primary transistor Q1 is suspended.

The described oscillating up and down of the oscillation circuit is repeated with a lower power consumption of the total circuit, until an additional consumer winding is brought into the magnetic circuit. This attenuates the voltage at the detection winding L3, so that the voltage at the capacitor C5 does not increase above the threshold, at which the second transistor Q1 is driven to conduction. In this state, the oscillation circuit oscillates, in accordance with a nominal operation mode for charging continuously at a high voltage and current level, wherein corresponding power can be drawn from the consumer winding.

Figure 2A:
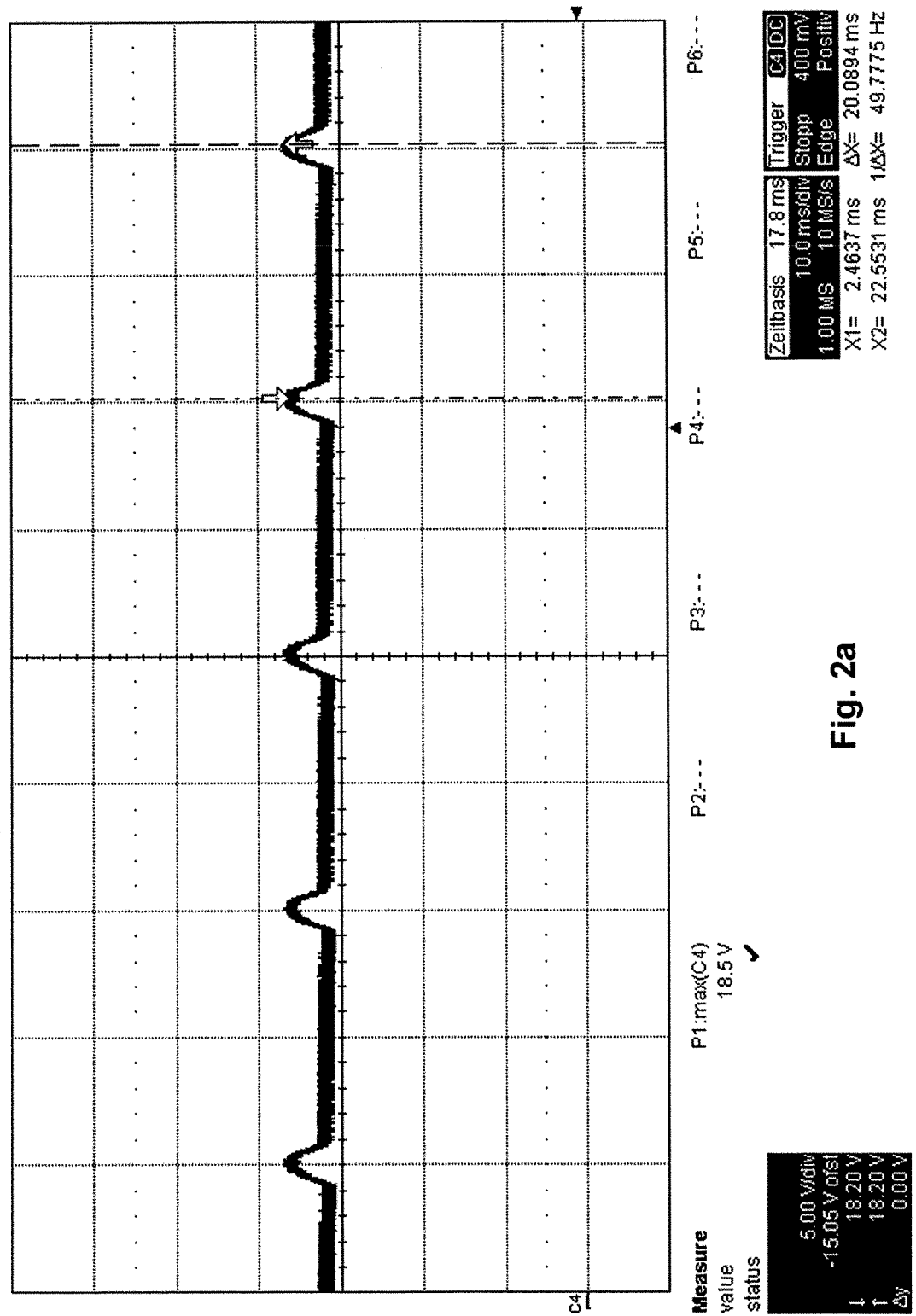
Figure 2B:
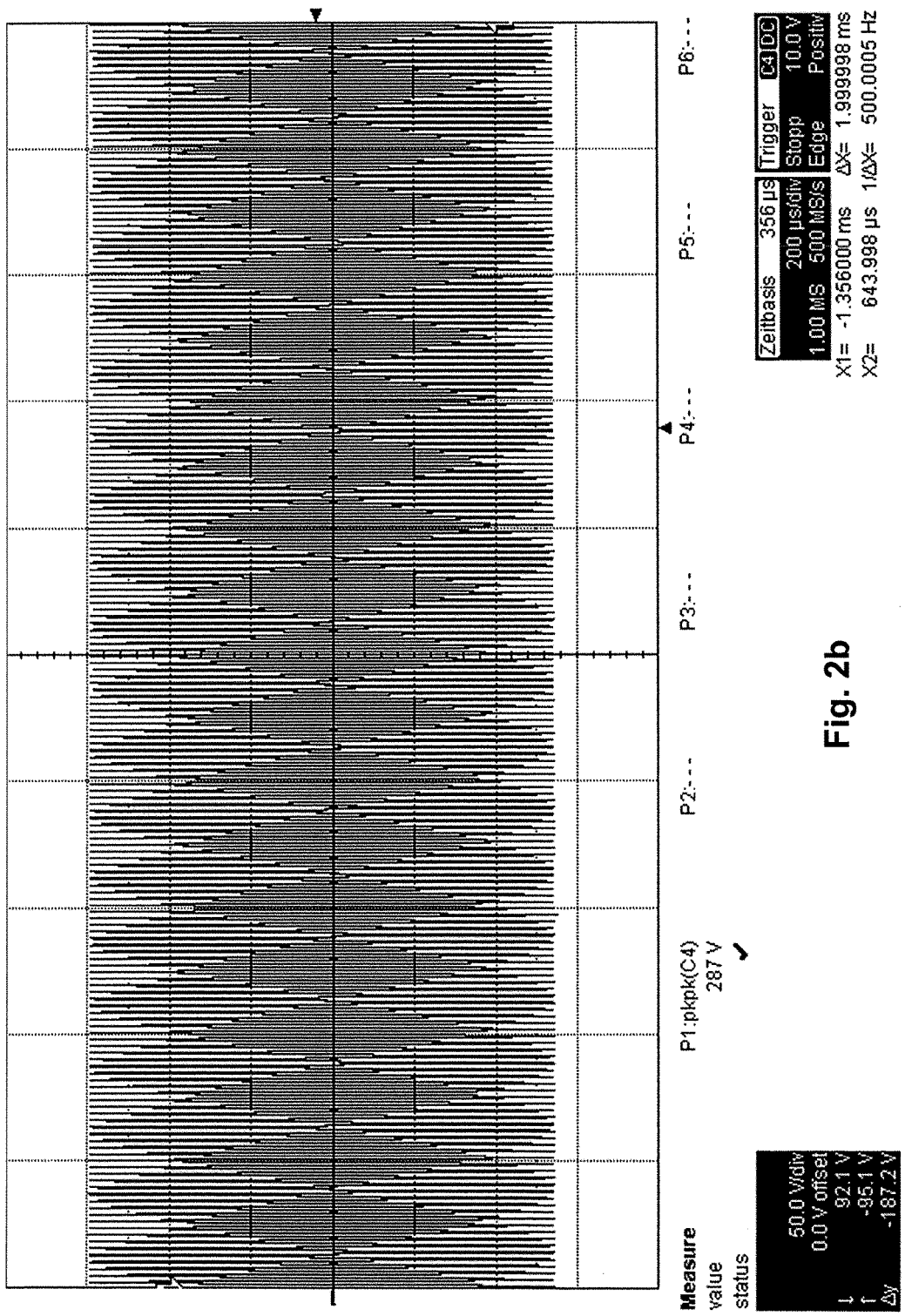
Figure 2C:
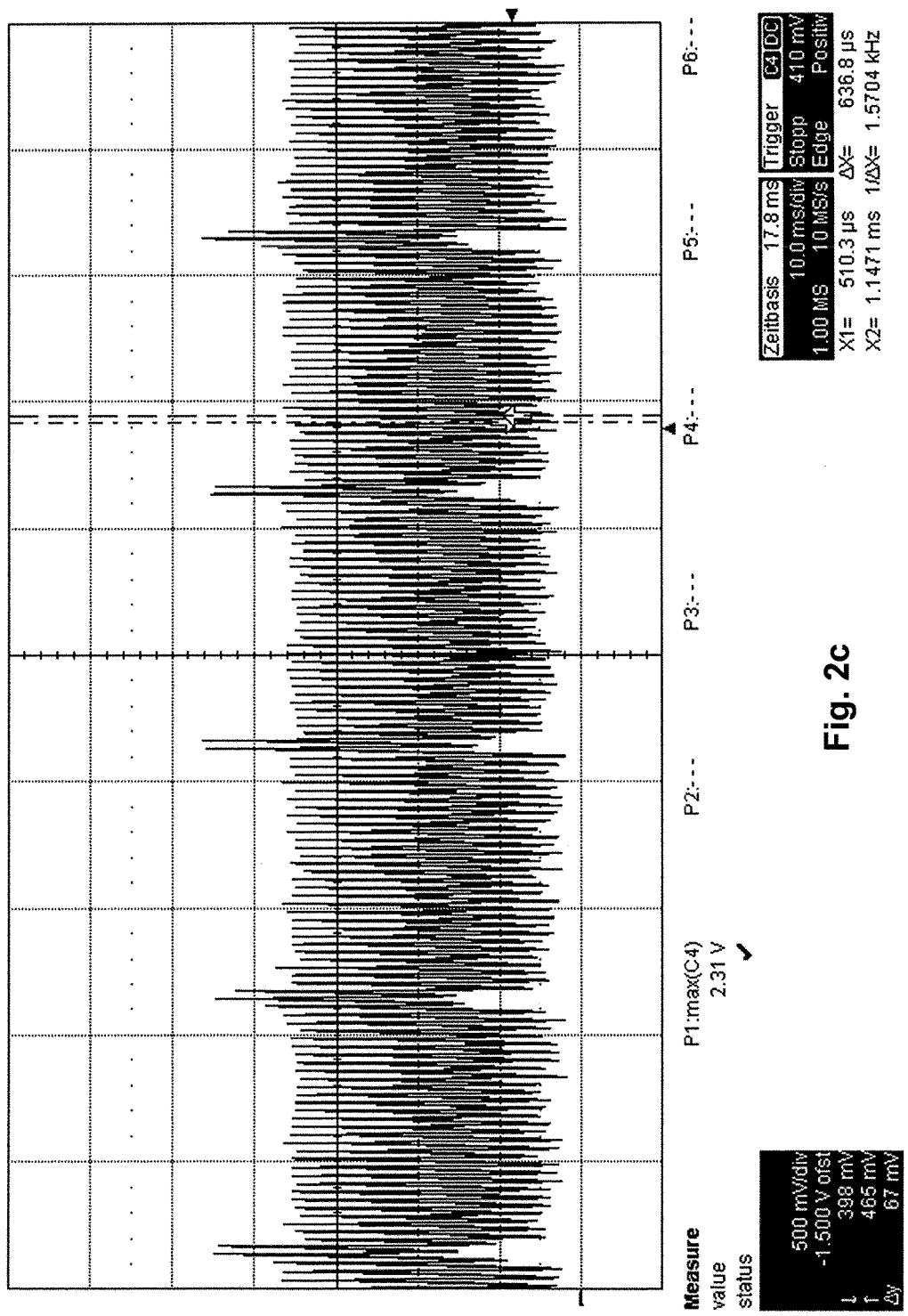
Figure 2D:
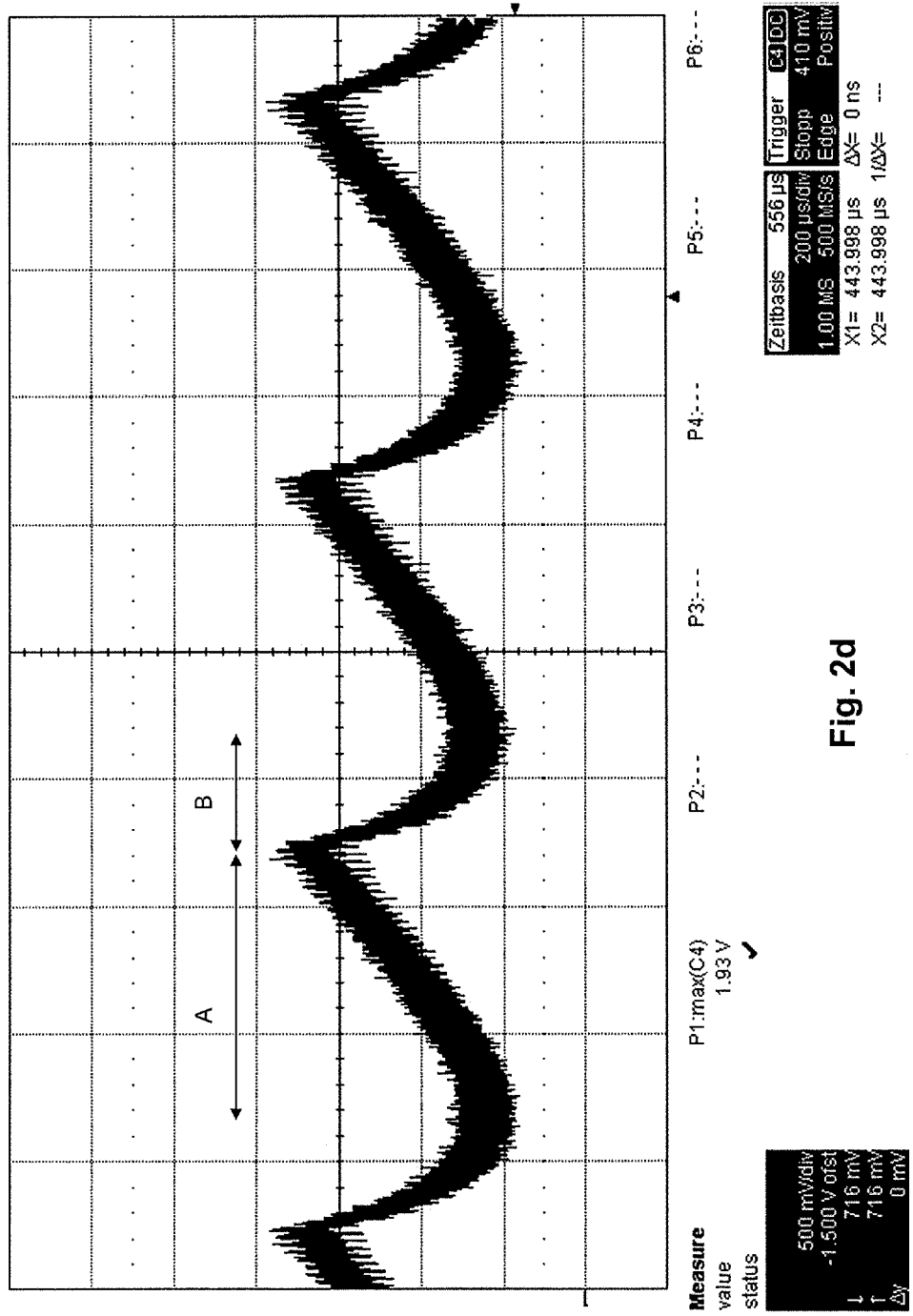
Figure 2E:
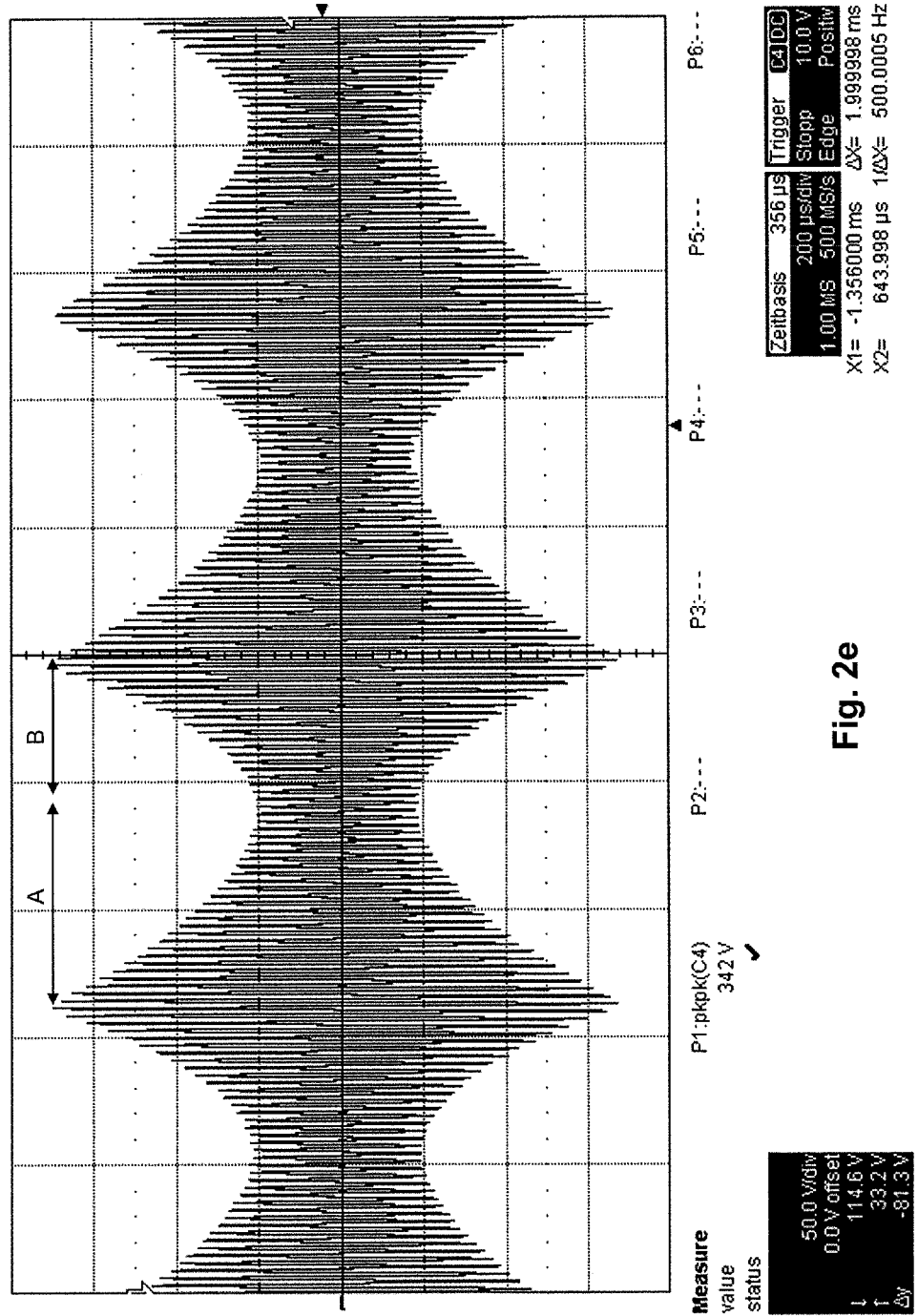

FIGS. 2a-e show temporal courses of variables on operation of the circuit. Of these, FIGS. 2a-b relate to the circuit in a loaded state. FIGS. 2c-e show a state without a loading of the charging circuit. For example, no hand-held device is thereby inserted into the charging device, or its battery is charged.

FIG. 2a shows a course of voltage across the resistor R6, thus at the base of the primary transistor Q1, in the loaded state. The horizontal scale corresponds to 10 ms per division and the vertical scale to 5 V per division. It can be recognised how the voltage varies about a high value, somewhat above 15 V (with an additional 50 Hz ripple). This corresponds to the switching-on and switching-off of the primary transistor Q1 at a frequency of the oscillation circuit, here about 90 kHz by way of example.

FIG. 2b shows the course of the resulting voltage across the primary winding L1, thus the voltage of the oscillation circuit, with a horizontal scale of 0.2 ms per division and with a vertical scale of 50 V per division. It can be recognised how the voltage oscillates at the mentioned frequency of the oscillation circuit and with amplitudes about 150 V.

FIG. 2c shows the course of the voltage across the resistor R6 in the unloaded state. The horizontal scale corresponds to 10 ms per division and the vertical scale to 0.5 V per division. It can be recognised how the voltage varies in a region between somewhat more than zero and somewhat less than 2 V FIG. 2d shows the course of the same variable as FIG. 2b, thus the base voltage of the primary transistor Q1 in the unloaded state, but with a horizontal scale of 0.2 ms per division.

FIG. 2e shows the associated course of the voltage across the primary winding L1, with a horizontal scale of 0.2 ms per division and with a vertical scale of 50 V per division.

One can recognise in FIGS. 2d and 2e, as to how the average base voltage periodically increases and then rapidly drops again. The increase of the base voltage leads to a settling (decay) of the voltage in the oscillation circuit (section A). If the oscillation circuit voltage and thus also the voltage in the detection circuit has settled to such an extent, that the second transistor Q2 blocks and the primary transistor Q1 conducts, then again energy is increasingly pumped into the oscillation circuit. This charging of the oscillation circuit corresponds to a relatively rapid increase of the oscillation circuit voltage or a rapid drop of the base voltage (section B). The charging lasts until the second transistor Q2 becomes conducting again and the primary transistor Q1 blocks. The described procedure repeats periodically according to a time constant which is determined essentially by a LC-member with a capacitor C4 and a resistor R8, said LC member being connected between the collector and base of the second transistor. The damping resistor R7 helps to additionally attenuate the primary oscillation circuit. It moreover limits the current through the oscillation circuit capacitor C6 and the primary transistor Q1.

In the present example, the charging and discharging of the oscillation circuits is repeated at a frequency of about 1.5 to 1.6 kHz. The oscillation circuit is thus kept in oscillation, so that if a load occurs, this can also be detected.

The mentioned capacitor C4 of the LC-member has a second function, in that with a further capacitor C3 which is connected between the feed voltage rail and the collector of the primary transistor it forms a starting aid for the oscillation circuit. For this, when switching on, i.e. with the feeding beginning, the two capacitors C3, C4 form a capacitive voltage divider which raises the voltage at the base of Q1, so that this becomes conducting and the oscillating-up of the oscillation circuit begins.

The power which is absorbed by the charging part can be reduced by way of the described circuit, from for example 1.5 W in the loaded state to for example 0.3 W in the non-loaded state.

The described circuit can operate with feed alternating voltages of 100 V to 250 V for example, with frequencies in the region of 45 Hz to 65 Hz for example. The detection of the charging state and the down-regulation of the feed of the oscillation circuit thereby automatically adapt themselves, as the oscillating-up of the oscillation circuit is effected more quickly or slowly, depending on the magnitude of the feed alternating voltage.

FIGS. 3-4 show further circuits for a charging part. These use a microprocessor or microcontroller or an application-specific integrated circuit (ASIC) 35. This is fed by a USB (universal serial bus) connection 34 for example with a plug or a socket 36. The USB connection comprises circuit elements for terminating the different leads in the known manner. The microprocessor or microcontroller at an analog input Ain detects a current measuring signal and with a digital output Dout activates a switch T31 of a driver circuit 32 by way of pulse width modulation (PWM) via a driver signal, for feeding an oscillation circuit 31 for energy transmission. The switch T31 by way of this is switched on in each case during the duration of a pulse of the driver signal and is switched off during the remaining time. The oscillation circuit 31 comprises an oscillation circuit capacitor C8 and a primary inductor L1. If a hand-held device or mobile part 2 is arranged such that a secondary inductance or secondary winding L2 is magnetically coupled to the primary inductance, then energy can be transmitted to the hand-held device 2. The pulse width modulation is effected at a frequency which is essentially the same as the resonance frequency of the oscillation circuit 31. This frequency can be larger than 20 kHz, thus above the audible range. This frequency can also be smaller than 100 kHz, in order to avoid electromagnetic interference by harmonics. The frequency advantageously is selected rather low, in order to reduce switching losses. The width of the pulse determines the duty cycle of the switch T31 and thus the time duration during an oscillation period, in which the oscillation circuit is fed. The duty cycle for example is between 0 and 40%.

The circuits of the FIGS. 3 and 4 moreover comprise a current measuring circuit 33. This comprises a shunt resistor Rs which is connected in a supply lead of the oscillation circuit 31. The current Is which flows from a supply lead and switched by the switch T31 into the oscillation circuit, thus also flows through the shunt resistor Rs. A voltage across the shunt resistor Rs is detected by way of a rectifying and filtering circuit C32, D32, D33, R34, C34 and is rectified and filtered. The filtered signal appears across a protective resistor R39 at the analog input Ain of the microcontroller or ASIC 35. The signal can be essentially proportional to the average charging current Is through the shunt resistor Rs.

The control of the charging procedure functions as follows: It is based on the fact that given the presence of a load which takes energy from the oscillation circuit 31, thus with a hand-held part 2 which is inserted and takes energy (for example not fully charged), the average charging current through the shunt resistance R2 into the oscillation circuit is larger than without a load. The current without a load is about 100 mA for example, and with a load 160-200 mA. Accordingly, a threshold value, departing from which a load is given as being present, can correspond to a current of 160 mA, and to this in turn a voltage at the analog input Ain of about 100 mV, depending on the design of the current measuring circuit 33.

A load detection can be carried out by way of the current measurement signal at the analog input Ain. For this, the following method can be carried out by the microprocessor or microcontroller or ASIC 36: If the charging part is supplied with electricity, it is firstly in a sleep state. In this state, the switch T1 is repeatedly activated with a PWM signal as a driver signal via the digital output Dout during the test time duration. No driver signal is generated during the remaining time and the switch T1 thus remains blocked. The test time duration can last between a few milliseconds or 10 milliseconds and several seconds. In particular, it can be about 50 milliseconds. The resulting current measurement signal is detected at the analog input Ain during the test time duration. The current measurement signal is compared to a first threshold value. If the current measurement signal is lower than the threshold value, then this means that no load is present (no hand-held device present, or the hand-held device requires no energy). In this case, the PWM signal is interrupted and a new test is carried out in the same manner not until after completion of the measuring interval. The measuring interval can last between a few seconds, thus 1-2 seconds, to several minutes, thus 1 to 5 to 10 minutes. In particular, it can last about 10 seconds. This procedure, thus the intermittent testing with the mentioned measuring interval can be repeated as long as the charging part is fed. If the current measurement signal is larger than the threshold value, then this means that a load is present. The PMW signal and thus the feeding of the oscillation circuit 31 are then continued. The charging part is thereby in a charging state. The current measurement signal continues to be monitored during the feeding of the oscillation circuit 31. If the current measurement signal drops below a second threshold value (which can be the same as or different from the first threshold value), then the charging part is brought again into the sleep state. As described above, it again tests intermittently with the measuring interval, as to whether a load is present.

According to an embodiment, the pulse width of the PMW signal can be [closed-loop] controlled in accordance with the current measurement signal, in the charging state. For this, the current measurement signal in the control device 35 can be compared to a setpoint which is stored for example. The pulse width can be adapted via a controller by way of the control difference resulting due to this. The controller for example is a P, PI or PID controller.

A feeding device, to which the charging part can be connected via a USB connection 34 for feeding the charging circuit, is typically a laptop computer or another portable or stationary data processing device. However, it can also be a battery pack or a mains adapter with a USB connection, which is only designed as a power supply and not for communication via a physical USB connection.

In the embodiment according to FIG. 3, the microprocessor or microcontroller 35 is configured for communication via a USB interface. Thereby, the microprocessor or the microcontroller in a manner known per se can notify the feeding device about a power requirement, according to the USB protocol. If the required power is granted by the feeding device, then the charging device can start a charging procedure. The charging device in the known manner can notify or confirm its presence to the feeding device at regular intervals.

If there the required power is not granted, then the charging device can either abstain from the charging procedure. Thereby, it can optionally trigger an acoustic and/or optic notification which indicates to the user that the charging power is not sufficient. Or the charging device, after a renewed enquiry at the feeding device, as the case may be, can start a charging procedure at a reduced power. In order to reduce the power, the modulation degree of the PWM modulation can be reduced to a maximal value in accordance with the power.

In the embodiment according to FIG. 4, the microprocessor or microcontroller 35 is not configured for communication via a USB interface, but only obtains a feed current from the physical USB connection.

Figure 4A:
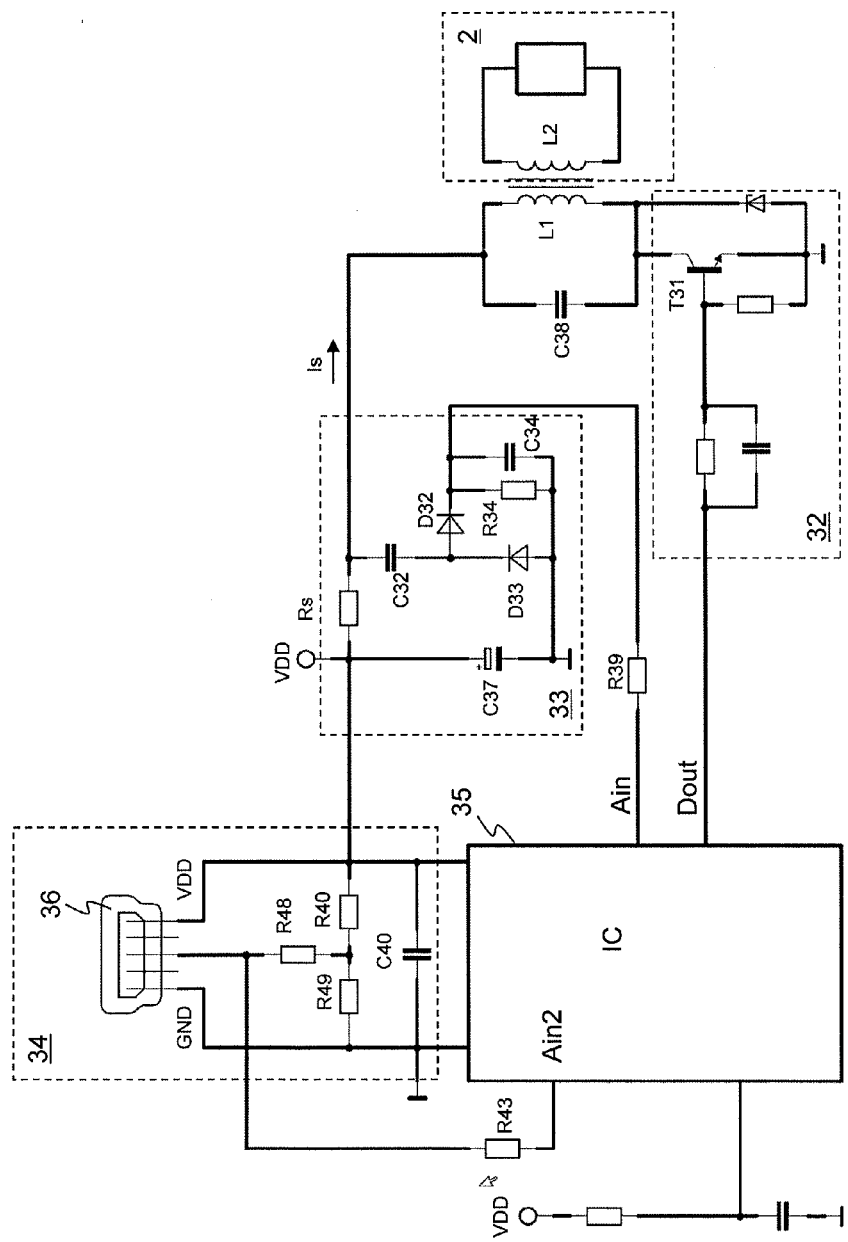

In the embodiment according to FIG. 4*a*, a circuit arrangement which allows the prevention of the charging part from loading a feeding device or supply device too much, also without implementation of a USB communication protocol, is additionally present to that embodiment of FIG. 4. The circuit arrangement, given a suitable programming of the microprocessor or microcontroller 35, permits the recognition as to whether the charging part 1 is fed from a mains device or for example from a PC or laptop.

The circuit arrangement comprises a voltage divider R49, R40 between the two USB supply leads GND, VDD. Its middle point is connected via an isolating resistor R48 and via a connection point Vp to one of the data leads D+ D− of the USB interface. The connection point Vp is connected via a further resistor R43 to a comparator input Ain2, for example an analog input, of the microprocessor or microcontroller 35.

The circuit arrangement functions as follows: A middle point voltage, for example of 3.3 Volts results at the middle point of the voltage divider R49, R40. This level can be deduced from the USB standard. The isolating resistor R48 for example can be 18 kOhm. The middle point voltage is equal to a nominal middle point voltage when the charging part 1 is not connected to a feeding device.

In the idle state, the leads D− and D+ are at 0 Volts in the feeding device, which for example is a computer. The feeding device recognises that a USB device was inserted by way of the raising of the voltage at D− or D+. The feeding device attempts to communicate with the putative USB device, in this case with the charging part 1. This lasts, for example, approx. 3 seconds. If, as in the present case, the feeding device obtains no reply from the charging part, then a notice such as "device not recognised"

is displayed at the feeding device, and the data lead is pulled to a level of 2 Volts. The charging part due to this change can recognise whether it has been connected to a mains adapter or to a computer or similar device.

The voltage at the data lead or at the connection point Vp is led via the further resistor R43 to the comparator input Ain2 of the microprocessor or microcontroller 35.

With a USB mains device, the data leads are not connected, and as a result the nominal middle point voltage (for example the 3.3 Volts) arises at the comparator input Ain2, and a charging can be carried out, i.e. the complete required power can be taken from the feeding device. If the data leads were to be connected to ground (VSS) or +5 Volts (VDD), which is not allowable, then a charging can also be carried out in this case.

The respective method, implemented in the microprocessor or microcontroller 35 for example, can take its course as follows: after inserting the USB cable on the feeding device, the following is effected:
  initialise the microprocessor or microcontroller 35;
  waite for a waiting time, for example 3 seconds;
  measure the voltage at the comparator input Ain2, this
    results in a value Uv;

If the measurement value lies within a band about the nominal middle point voltage, then this corresponds to the fact that the feeding device realises a communication according to the USB standard. This is the case for example if Uv >1.8 Volts or Uv<2.2 Volts. The charging device 1 can thus decide not to charge, in order to preserve the feeding device. The charging procedure is thus not started.

If the measurement value lies outside the band about the nominal middle point voltage, then this corresponds to the fact that the feeding device is a mains adapter. This for example is the case if Uv<=1.8 Volts or Uv>=2.2 Volts. The charging part 1 can thus decide to charge. The charging procedure is therefore started.

Regarding the decision not to charge, an acoustic and/or optical notification can be optionally activated, and this indicates to the user that the charging power is not sufficient. Or the charging device can start a charging procedure at a reduced power.

FIGS. 5-6 show circuits for a hand-held device 2. FIG. 5 shows a circuit which is only formed with discrete components, thus without integrated circuits. The circuit via the secondary winding L2 receives energy from the charging part 1. The voltage at the secondary winding 12 is rectified via a rectifier diode D2, in this case a Schottky diode, and charges a battery G2. A switch S51 via a two-transistor circuit T51, T52 activates a motor M of the hand-held device 2. The potential at the control input B of an input transistor T52 is raised (to the plus pole of the circuit or of the battery), given an actuated switch. The two transistors T51, T52 become conducting by way of this, and the motor M is fed by the battery G51.

A protective circuit D51, R55, C51, R54, Q51 is designed to switch off the feed of the motor when the hand-held device 2 is inserted in the charging part 1 and is supplied with energy. The protective circuit comprises a measuring rectifier D51, R55, C51 which for example is designed as a half-wave rectifier. This detects a charging current Ic which flows through the secondary winding L2 and through the battery G1. It is based on a variable from the charging current circuit, here by way of example, on the voltage across the rectifier diode D52. A half-wave acts across a further diode D51 from this voltage in each case, for charging a measuring capacitor C51. A MOFSAET Q1 is connected between a control input B of the input transistor T52 and a lower potential (to the minus pole of the circuit or of the battery). The voltage of the capacitor C51 is present at the control input of the MOSFET Q1. The MOSFET Q1 transmits which is to say becomes conducting, if the voltage at the capacitor C51 is sufficiently high. By way of this, it pulls the voltage at the control input B of the input transistor T52 downwards and thus switches off the feed of the motor, even if the switch S51 is actuated, thus is conducting.

Concluding, the feeding of the motor is thus switched off if a signal which indicates that the hand-held device 2 is supplied with energy from the charging part 1, occurs in the charging circuit.

The complete circuit can also be realised with dual switch elements (NPN instead of PNP transistors and vice versa) and exchanged polarities of the remaining elements.

FIG. 6 shows a further circuit for a hand-held device 2. The circuit comprises an integrated circuit IC61 which can be a microprocessor or microcontroller or ASIC. It is indicated hereinafter as a microcontroller for the sake of simplicity. The circuit further comprises:

A secondary winding L2 and a rectifier diode D2, in this case a Schottky diode, for rectifying a voltage at the secondary winding L2 and for charging a battery G1. Individual components such as the secondary winding L2, the battery G1 and a motor M are connected via connection locations k onto a printed circuit board, on which the remaining parts can be arranged.

A driver circuit 64 with which a circuit through the motor M and the battery G1 can be closed and opened by way of the semiconductor switch Q61 (typically a MOSFET) and thus the motor M can be switched on and off. The driver circuit is connected to a control output GP2 of the microcontroller IC61 and is activated via this output.

A feed circuit 61 with a DC-DC converter. This comprises an integrated converter component IC62, for example of the type MCP 1624, and a converter inductor L64. The DC-DC converter is designed to generate a constant and stable direct voltage essentially independently of the voltage of the battery G1. In the present example, the direct voltage is 3V and the voltage of the battery G1 can be between 0.8 V and 1.4 V. A feeding of further elements of the circuit via a positive and a negative supply voltage terminal is realised with this direct voltage. Since the direct voltage is controlled to a known value, according to an embodiment it also serves as a reference for monitoring the battery voltage by way of the microcontroller IC61.

A push-button circuit 63 with a push-button S61 and with a debouncing circuit. The push-button circuit 63 is connected to a switch input GP3 of the microcontroller 63, for detecting activations of the push-button S61.

An indicator circuit 62 for the indication of operating states of the hand-held device 2. This comprises a series connection of a diode D62 with an upper light-emitting diode LED1 and with a lower light-emitting diode LED2 which is connected between the positive and the negative supply voltage terminal. A common connection point between the two light-emitting diodes LED1, LED2 is connected via a limiting resistor R64 to a display output GP1 of the microcontroller IC61 for activating the light-emitting diodes.

A measuring circuit 65 for detecting the presence of a charging device. The measuring circuit is connected to a measuring input GP0 of the microcontroller IC61.

The measuring circuit 65 permits the realisation of three functions via the common measuring input GP0:

1. If the secondary winding L2 is not fed and the motor is not in operation, then the measuring input GP0 can be used for programming the microcontroller IC61.
2. If the hand-held device 2 is inserted into the charging part 1, and the secondary winding L2 is fed, then the presence of the charging part 1 can be recognised at the measuring input GP0.
3. If the secondary winding is not fed, then the charging state of the battery G1 can be detected at the measuring input GP0.

The measuring circuit 65 for this is constructed as follows: The measuring circuit 65 comprises an decoupling resistor R65, with which a measuring point P of the circuit is connected to the measuring input GP0. The measuring point P is connected via a measuring diode D64 and a measuring resistor R60 to a first terminal of the rectifier diode D2. The measuring point P is connected via a measuring capacitor C64 to a second terminal of the rectifier diode D2. The measuring point P is connected via a protective diode D63 to the positive voltage supply VDD. The measuring point P is connected via a battery voltage measuring resistor R67 to the potential +UB of a (positive) pole of the battery G1.

The measuring circuit 65 functions as follows:

The decoupling resistor R65 isolates the remaining elements of the measuring circuit 65 from the measuring input GP0 and permits the programming of the microcontroller IC61. The decoupling resistor R65 also protects the measuring input GP0 from voltage peaks at the measuring point P, as can occur for example on switching off.

The measuring diode D64, the measuring resistor R60 and the measuring capacitor C64 form a measuring rectifier which for example is designed as a half-wave rectifier. In each case, it detects a half-wave of the voltage across the rectifier diode D2 and with this charges the measuring capacitor C64. An element other than the rectifier diode D2, for example a measuring shunt, can also be used in the charging current circuit, across which other element a voltage occurs given the presence of a charging current Ic through the secondary winding L2 or the battery G1. The rectifier diode D2 and the other element can also be arranged at another location in the charging current circuit. Thus the measuring capacitor C64 is charged if the secondary winding L2 is fed and a charging current flows. This voltage is measured at the measuring input GP0. It indicates that the hand-held device 2 is in a charging part 1 or is at least fed. If the motor M should be switched on, then the motor M can be switched off by this voltage.

The protective diode D63 leads away overvoltages which get from the charging current circuit via the measuring diode D64 to the measuring point P.

The battery voltage measuring resistor R67 pulls the voltage at the measuring point P to the potential +UB, corresponding to the battery voltage. If the hand-held device 2 is not fed via the secondary winding l2, then the voltage at the measuring point P as well as at the measuring input GP0 is equal to the battery voltage.

The voltage at the measuring point P, as is set by the charging current, is always greater than the maximal possible battery voltage, for example 1.4 V, by way of a suitable dimensioning of the rectifier diode D2 and the measuring rectifier. A threshold value can thus be fixed, which is somewhat above the maximal battery voltage. A voltage measured at the measuring input GP0 and which lies below the threshold value then corresponds to the battery voltage, and a voltage which lies above the threshold value indicates that the hand-held device 2 is fed via the secondary winding L2.

Two light-emitting diodes LED1, LED2 are controlled with a single display output GP1 in the indicator circuit 62. If the display output GP1 has a high-impedance, then none of the light-emitting diodes LED1, LED2 shines, since the sum of the voltage thresholds or threshold voltages of the two light-emitting diodes LED1, LED2 and of the third diode D62 lies above the feed voltage. These voltages for example are: LED1 (red): 1.8 V; LED2 (green): 2.2 V; D2: 0.7 V; sum: 4.7 V; feed voltage 3 V. If the microcontroller IC61 pulls the display output GP1 upwards, to the positive supply voltage VDD, then the lower light-emitting diode LED2 shines. If the microcontroller IC61 pulls the display output GP1 downwards, to the negative supply voltage VSS, then the upper light-emitting diode LED1 shines.

A low charging state of the battery G1 can be displayed by way of the flashing of a red light-emitting diode, for example in a permanent manner, or only when the device is in operation, thus when the motor is switched on. A normal charging state of the battery G1 can be displayed by illumination of a green light-emitting diode LED2.

A discharged state of the battery G1 can be displayed by way of permanent light of a red light-emitting diode during a limited time, for example for 5 to 10 or 15 seconds. This for example is effected if the switch S61 is actuated. The energy which is available after a recuperation phase of the battery G1 can then be sufficient to activate the light-emitting diode in this manner. The motor is thereby not switched on.

Additionally or alternatively to the display by way of light-emitting diodes or other optical elements, a display of operating states can also be effected by way of acoustic generators or by vibrations.

The driver circuit 64 or the semiconductor switch Q61 can be continuously switched on by the microcontroller IC61, so that the motor is thus permanently fed by the battery. The microcontroller IC61 however at its control output GP2 can also generate a signal which for example is pulse-width modulated, so that a current through the motor M is also pulse-width modulated. The frequency of the signal for example can be 400 Hz to 500 Hz. Various power stages or speeds of the motor M, for example 60% and 80%, apart from a full power of 100%, can be realised by way of variation of the modulation degree of the pulse-width modulated signal. Moreover, an intermittent operation with an alternatingly high and low power ("massage operation") can be realised. With a toothbrush for example, the motor can be cyclically operated at full power for 600 milliseconds and then switched off for 60 milliseconds. The time intervals and power stages with such an intermittent operation can be selected depending on the applied brushes and gears.

According to an embodiment, a switching between such power stages is realised by way of the microcontroller IC61 with each actuation of the push-button S61 switches to a next stage. Thus for example, with the repeated actuation of the push-button S61, the device goes through the sequence of states: "switched-off"-"100%"-"80%"-"60%"-"switched-off".

According to an embodiment, the microcontroller IC61 is designed to switch off the motor M if no actuation of the push-button S61 has taken place during a time period, for example a time between 6 and 10 minutes. With this, one prevents the battery from being emptied if the hand-held device has been inadvertently switched on, for example when transporting the hand-held device.

The mechanical design of the charging part 1 and of the hand-held device 2 as well as their interaction is explained by way of FIGS. 7-12. The hand-held device 2 by way of example is thereby an electric toothbrush, but can also be a different type of small device which is typically applied in a manner held in the hand, in particular a device for body care. The charging part 1 forms a charging station with a foot which carries the hand-held device 2 which is set upon it, and can inductively supply this hand-held device with electric energy. Thereby, a peg 12 which can be essentially cylindrically shaped projects from the charging part 1. A recess 22 which is shaped in a manner corresponding to the shape of the peg 12 is formed on the foot of the hand-held device 2. The peg 12 and the recess 22 define the mutual position between the charging part 1 and the hand-held device 2, preferably with little play. They define the mutual position at least with respect to translation in a plane normal to a longitudinal axis or symmetry axis or cylinder axis of the peg 12. The hand-held device stands on a rest surface 15 of the charging part 1, when it is placed onto the charging part 1. Thereby, a base surface 25 of the hand-held device 2 lies opposite the rest surface 15. The base surface 25 itself or a projecting edge of the hand-held device housing 21 lies on the rest surface 15.

According to an embodiment, the mutual position with regard to a rotation about a longitudinal axis or symmetry axis or cylinder axis of the peg 12 is defined by further corresponding shapings on the charging part 1 and the hand-held device 2. In the present example these are indentations 13 on the charging part housing 11 and corresponding projections or prominences or lugs 23 on a hand-held device housing 21. FIGS. 10, 12, 13 and 14 are above all referred to concerning this. On placing the hand-held device 2 onto the charging part 1 in the correct angular position with respect to rotation about the longitudinal axis, the lugs 23 move into the indentations 13 and prevent a further relative rotation. Vice versa, a projection 14 on the charging part housing 11 and which is arranged between the indentations 13 moves into an intermediate space 24 which is arranged between the lugs 23 on the periphery of the hand-held device housing 21. FIG. 10 shows a horizontal cross section through the charging part 1 and the hand-held device 2 at the height of the lugs 23 or indentations 13. The cross section leads through a base 211 of the hand-held device housing 21. The hand-held device can but does not need to be placed into the rotation lock. The function is ensured despite this, if the hand-held device is placed in a rotated manner.

According to other embodiments of the invention (not represented in the figures), other combinations and placing of shapings can be present on the charging part 1 and hand-held device 2. For example, lugs can be formed on the charging part housing 11 and corresponding indentations on the hand-held device housing 21. Moreover, not only can corresponding shapes be arranged in the region of the outer periphery of the foot of the hand-held device 2, as shown, but alternatively or also additionally in the region of the peg 12 and correspondingly on the inner side of the recess 22. In further embodiments, the shape of the lower part of the hand-held device housing 21 can be shaped in a manner corresponding to the shape of a receiving opening in the charging part 1, so that the hand-held device 2 can only be inserted in a single orientation.

An additional advantage of a hand-held device housing 21 with an otherwise essentially round cross section being secured against rolling away by way of the projecting elements when placed onto a horizontal surface results in the case of projecting elements on the hand-held device housing 21, such as the lugs 23. Thereby, in the case of a toothbrush, the projecting elements are advantageously placed such that its bristles point perpendicularly upwards. The lugs 23 for this can further serve for correctly positioning the hand-held device 2 in a packaging.

FIG. 11 in a perpendicular cross section along a longitudinal axis of the device, apart from the already described parts shows a ferrite core 3 of the inductive transmitter. In the shown embodiment, the ferrite core 3 is part of the charging part 1. A first section of the ferrite core 3 is arranged in the peg 12.

In other embodiments, the ferrite core 3 can also be arranged in the hand-held device 2 and project into a region of the charging part 1. In other embodiments, it is even possible for no ferrite core at all to be provided. In the present example in FIG. 11, the ferrite core has a cylindrical basic shape and is round with regard to its cross section, wherein other closed cross sections can also be realised. In further embodiments, a pot core or an E-core or a U-core can be present, in each case with correspondingly arranged windings. A multi-part core can also be present in each case with all of the described core variants, with a first core part in the charging part 1 and a second core part in the hand-held device 2.

A second section of the ferrite core 2 lies in a primary winding 18 which is held by way of a charging part coil body 17. The charging part coil body 17 also carries a detection winding 19. This is likewise arranged around the ferrite core 3 and as initially described can provide a measured variable for the [closed-loop] control of the power to be fed in.

In the hand-held device 2, a secondary winding 28 is arranged around the recess 22 or around a section of a wall of the base 211 or of the hand-held device housing 21, said section defining the shape of the recess 22. The secondary winding 28 can be carried by hand-held device coil body 27. In another embodiment, the hand-held device coil body 27 is formed as one piece with the base 29. The hand-held device coil body 27 comprises an integrally formed support section 271, thus a support section which is formed as one piece with the hand-held device coil body 27. The support section 271 is elastically deformable on account of its shape, in cooperation with its material. If the base 211 with the hand-held device coil body 27 is correctly inserted into the hand-held device 2, then the hand-held device coil body 27 with its support section 271 presses in the longitudinal direction against the battery 4 and thereby elastically deforms. The battery 4 is held in a biased manner in the hand-held device 2 by way of this. A resilient holding or fixation of the battery 4 is realised with a low design effort by way of this. Tolerances in the longitudinal direction which could otherwise lead to an unreliable electrical contacting of the battery 4 can be compensated with this for example. Such tolerances in particular can occur between the base 211 and the remaining hand-held device housing 21.

The different parts of the charging part housing 11 and hand-held device housing 21 are typically of plastic. The two coil bodies 17, 27 can likewise be manufactured of plastic, in particular of a softer or more elastic plastic than the two housings 11, 21.

FIGS. 13-14 show views of the base 211 of a hand-held device. Notches or grooves 26, in particular a pair of grooves which lie opposite one another with respect to the recess 22, are arranged subsequently to the recess 22. A flat, round object, for example a coin, can be led into the grooves 26 and then be used for rotating the base 211. The base 211 can thus be screwed or broken out of the hand-held device housing 21. This can be advantageous, in order to exchange and/or dispose of the battery 4.

In an embodiment, the grooves 26 also serve for defining the mutual position of the charging part 1 and hand-held device 2 with respect to a rotation about the longitudinal axis. Suitable corresponding projections are then arranged in the lower region of the peg 12, for example in a transition region between the peg 12 and the rest surface 15.

FIGS. 15-18 show views and sections of further hand-held devices 2 which are designed as massage or facial brushes, as well as charging parts 1 which are designed to match these. FIG. 16 shows a section through the device of FIG. 15. FIG. 18 shows a section through the device of FIG. 17. The hand-held device 2 of the FIGS. 15 and 16 analogously to the previously described hand-held devices 2 of the FIGS. 7 to 14 comprises a recess 22, by way of which the hand-held device 2 can be stuck on a peg 12 of the charging part 1. The energy transmission can likewise be effected whilst using a primary winding 18, a detection winding 19 and a secondary winding 28, wherein a ferrite core 23 can be arranged in a manner matching these windings or cooperating with these windings. The hand-held device 2 of FIGS. 17 and 18 instead of or additionally to the recess 22 comprises a contour on a lower end 22a of a grip part, said contour being shaped in a manner matching a depression 12a in the charging part 1. The hand-held device 2 can be placed with the lower end 22a into the depression 12a for keeping or for charging, and therefore a stable position can be kept. A primary winding 18 and a secondary winding 28 can be present for energy transmission, wherein the primary winding 18 encompasses the lower end 22a of the grip part. A design with an addition detection winding (not shown in this figure) is also conceivable.

The inner workings, thus the inner components of a hand-held device are schematically represented in the FIGS. 16 and 18. A drive or motor 44 as a consumer, and a battery carrier 40 which amongst other things carries a battery 42, a printed circuit board 43 including a switch or push-button 45 and on which a switch pressing aid 41 is formed are particularly visible.

FIG. 19 shows a circuit for a charging part 1, which is particularly simple to realise. The circuit comprises the following elements:

- A Colpitts-oscillator with the primary winding L1, an oscillation circuit capacitor C72, a further capacitor C73 and a resistor R74, an oscillator transistor T71 and base resistors R72, R73.
- An additional capacitor C74 which is connected between the positive feed terminal and the control input of the oscillator transistor T71. The additional capacitor C74 can serve as an oscillation starting aid.
- A Zener diode D71 which is connected between the positive and a negative feed terminal and limits a feed voltage.
- A smoothing capacitor C75 which is connected between the positive and the negative feed terminal.
- A bridge rectifier B71 which feeds the positive and the negative feed terminal from alternating voltage terminals X71, X72.
- An impedance of a parallel connection of a limiting resistor R71 and a limiting capacitance C71 which is connected between one of the alternating voltage terminals X71, X72 and the bridge rectifier B71. The impedance can be considered as a series resistance for the oscillator. It essentially limits the power consumption of the circuit.

FIG. 20 shows a charging circuit for a hand-held device 2, with which an energy management can be realised for the reduction of the power consumption. Elements of a drive circuit which are also yet necessary for the operation of the hand-held device 2 are not shown. The charging circuit is controlled by a computation- or control unit CPU, for example a microcontroller. The charging circuit comprises the following elements:

- A positive terminal +UB and a negative terminal −UB on a battery G1.
- A secondary winding L2 which can be switched onto the positive and the negative terminal via a feed rectifier diode D81, here a Schottky diode by way of example, and via an isolating switch T82, here a transistor, and can thus charge the connected battery G1.
- A detection circuit 215 with a series connection of a detection rectifier diode D82 with an upper R85 and a lower R90 voltage divider resistor, wherein a filter circuit with a filter capacitor C81 and a Zener diode D83 as an overvoltage protection is connected parallel to the lower voltage divider resistor R90, at the common connection point of the voltage divider resistors R85, R90, and the common connection point is connected via a first protective resistor R86 to a fourth terminal P4 of the control unit CPU. The fourth terminal P4 functions as an input and thus permits a detection, as to whether a voltage, in particular an alternating voltage is present at the secondary winding L2. With this, one can ascertain whether the hand-held device 2 is fed by the charging part 1 and thus whether the battery can be charged. Or a motor of the hand-held device 2 can be switched off in the case that it is still switched on, when the hand-held device 2 is placed into the charging part 1.
- A battery voltage measurement 212 with a series connection of a second protective resistor R89 to an RC-filter of a filter resistor R88 and a filter capacitor C82. The RC-filter in particular filters disturbances/interference due to a running motor. The battery voltage measurement is connected between the positive terminal and a first terminal P1 of the control unit CPU. The first terminal P1 functions as an input and thus permits a measurement of the battery voltage.
- An isolating circuit 213 with the isolating switch T82 and a base supply which is connected between the control input B of the isolating switch T82 and the common connection point of the isolating switch and of the feed rectifier diode D81. The base supply comprises a base resistor R82 parallel to a base capacitor C83. If the secondary winding L2 provides a secondary voltage, then a voltage also appears at the mentioned common connection point, and likewise at the control input B. The isolating switch T82 becomes conducting due to this and a charging current can flow into the battery G1. The base capacitor C83 permits a rapid increase of the voltage at the control input B after the secondary voltage increases. The base resistor R82 subsequently limits the current into the control input B. A further base resistor R81 is connected between the control input B and the positive terminal +UB, in order to pull the control input to a defined potential, if no voltage is present from the feed rectifier diode D81. The previously described function of the isolating circuit 213 is not reliant on the functioning of the central control unit CPU. The isolating circuit 213 thus also functions when the battery G1 is discharged to such an extent that the control unit is not in operation.
- A booster circuit which is connected between the second terminal P2 of the control unit CPU and the control input B of the isolating switch T82, and with which a potential at the control input B can be activated by way of the control unit CPU. This booster circuit for example comprises a protective resistor R87 in series with a protective diode D84. The second terminal P2 is an output and thus, when the control unit CPU is in operation, the isolating switch T82 can also be switched on or kept switched on by the control unit CPU, or in other words the through-connection of the isolating switch T82 can be improved. This is the case with an activated booster circuit.
- A charging suppression circuit 214 with a switch Q81, in particular a MOSFET, which pulls a voltage at the control input to a fixed reference voltage and can thus suppress a switching-on of the isolating switch T82. The switch Q81 for example can pull the potential at the control input B to zero. The switch Q81 can be activated via a voltage divider R83, R84 from a third terminal of the control unit CPU which acts as an output. With this, a charging procedure of the battery G1 can be interrupted by the control unit CPU. The isolating switch T82 thus blocks given an activated charging suppression circuit CPU, and the charging procedure of the battery G1 is suppressed.

FIGS. 21*a*-21*b* show a flow diagram for a method for energy management, for example by way of the circuit described in FIG. 20. The method comprises the following steps, wherein the first step is abbreviated by S1, the second by S2, etc.

S1 This corresponds to a starting state, when the battery is empty: the control unit CPU is thus not in operation. The method begins afresh from here.

S2 As soon as a voltage for feeding the control unit CPU is present, a reset of the control unit CPU is carried out automatically by the control unit CPU itself. This is triggered when the hand-held device 2 is fed by a charging part 1.

S3 Internal flags "power on", "coil on" and "boost on" are set. A threshold value CT for a timer is set to a defined and permanently stored value, which represents a minimum charging time, for example more than 6 hours, typically about 14 hours. The timer, also called charging time counter, is set to zero. A threshold value U_level is set to a defined, permanently stored upper value.

S4 The control unit CPU is initialised. Thereby, for example terminals are defined as inputs or outputs, outputs are set to defined initial values, interrupts are activated, variables, counters, PWM units and oscillators are initialised, function blocks of the processor are switched on or off depending on requirements, etc.

S5 This is the first step of a loop of the method which is carried out repeatedly—as long as the control unit CPU is fed: it is examined as to whether the flags "coil on" and "power on" are set.

S6 If this is not the case, the charging procedure is suppressed ("coil OFF"), thus the isolating switch T82 opened or held open, and the booster circuit is deactivated ("boost OFF").

S7 The control unit CPU is prepared for a sleep state.

S8 The control unit CPU is in the sleep state, in which as many as possible functions are switched off for the reduction of the power consumption. A watchdog timer remains active, in order to wake the control unit CPU after a defined sleep interval.

S9 After waking up the control unit CPU, it is examined as to whether the waking was triggered by the watchdog timer (whereupon the method continues further at S14), or by way of actuating a push-button or a corresponding interrupt of the control unit CPU (whereupon the method continues further with S10).

S10 It is examined, for example by way of the signal at the fourth terminal P4, as to whether the hand-held device 2 is located in the charging part 1 which is to say is charged by this. If yes, then the method continues further with S5, if not, with S11.

S11 A threshold U_level is set to a defined, permanently stored upper value.

S12 The motor of the hand-held device 2 is switched-on, for example for the drive of a toothbrush or a facial or massage brush.

S13 The switching-off of the hand-held device 2 by the user is recognised, and the method continues further with S5

S14 The device was woken from the sleep state by the watchdog timer. It is examined as to whether the hand-held device 2 is located in the charging part 1 or is charged by this. If not, then no charging is possible and the method continues further with S5, if yes with S15.

S15 The flag "power on" is enquired. If it is set, then the method continues further with S16 for charging the battery, of not, then with S20.

S16 The charging time counter is incremented.

S17 The charging procedure is switched on or remains switched on ("coil ON"), thus the isolating switch T82 is closed or kept closed, and the booster circuit is activated or remains activated ("boost ON"). The respective two flags are set.

S18 It is examined as to whether the charging time counter has exceeded the threshold value CT. If not, the method continues further with S5, if yes, then with S19.

S19 The defined charging time has been reached and the charging procedure can be stopped. The flag "power on" is cleared and the method continues further with S5. This causes the branching to be different the next time that S15 is executed.

S20 The battery voltage U_akku is measured.

S21 The battery voltage U_akku is compared to the threshold value U_level. If it exceeds the threshold value, the method continues further with S24, if not with S22.

S22 The charging procedure is switched on ("coil ON") and the booster circuit activated ("boost ON"). The respective two flags are set.

S23 The threshold value U_level is set to the upper value. The method continues further with S5.

S24 The charging procedure is switched off or remains switched off ("coil OFF") and the booster circuit deactivated or remains deactivated ("boost OFF"). The respective two flags are cleared.

S25 The threshold value U_level is set to a predefined, permanently stored lower value. The method continues with S5.

The use of the upper and the lower threshold value for U_level leads to the battery being charged again up to the upper threshold value, after a use of the hand-held device 2, in particular after operation of the motor or after falling short of the lower threshold value. The charging procedure remains switched off after the battery voltage has reached the upper threshold value, until either the lower threshold value is fallen short of, or the hand-held device 2 is used. The upper threshold value can for example be 1400 mV, the lower for example 1300 mV, depending on the type of battery.

The charging procedure is carried out for a minimum charging time after the battery has run empty, irrespective of the battery voltage.

The descriptions concerning the specific figures can of course also be applied to other figures which show the same or similar characteristics and in which the characteristics are not described with the same level of detail.

The invention claimed is:

1. A charging device for contactless transmission of energy for the energy supply of a cordless hand-held device, wherein the charging device comprises:
   an electronic circuit for feeding an inductive energy transmitter, the circuit being configured to adapt energy fed to the inductive energy transmitter, in accordance with energy taken from the inductive energy transmitter, the circuit comprising:
   a primary winding for feeding a hand-held device, wherein the primary winding is part of an oscillation circuit;
   a driver circuit for the pulsed feeding of energy into the oscillation circuit in accordance with a driver signal;

a current measuring circuit for producing a current measurement signal corresponding to a current flowing into the oscillation circuit; and a control device which is configured to detect the current measurement signal and, in accordance with the current measurement signal, to generate the driver signal for the activation of the driver circuit, as a pulse-width modulated signal with a frequency corresponding to a resonance frequency of the oscillation circuit, wherein the current measuring circuit comprises a measuring shunt and a rectifier circuit for rectifying a voltage occurring across the measuring shunt and for generating the current measurement signal, and the control device comprises a microprocessor or microcontroller comprising an analog input for determining the current measurement signal.

2. A charging device according to claim 1, wherein the control device is configured to be situated in a sleep state or in a charging state, wherein in the sleep state the control device intermittently generates a driver signal during a test time period, thus feeding energy into the oscillation circuit, to test whether the current measurement signal thereby exceeds a first threshold value, and if this is the case, the control device changes its state to the charging state, and if this is not the case, the control device remains in the sleep state.

3. A charging device according to claim 2, wherein the control device is configured, in the charging state, to continuously generate the driver signal, to test whether the current measurement signal thereby falls short of a second threshold value, and to change into the sleep state if this is the case, and to remain in the charging state if this is not the case.

4. A charging device for contactless transmission of energy for the energy supply of a cordless hand-held device, wherein the charging device comprises:

an electronic circuit for feeding an inductive energy transmitter, the circuit being configured to adapt energy fed to the inductive energy transmitter, in accordance with energy taken from the inductive energy transmitter, the circuit comprising:

a primary winding for feeding a hand-held device, wherein the primary winding is part of an oscillation circuit;

a driver circuit for the pulsed feeding of energy into the oscillation circuit in accordance with a driver signal;

a current measuring circuit for producing a current measurement signal corresponding to a current flowing into the oscillation circuit; and a control device which is configured to detect the current measurement signal and, in accordance with the current measurement signal, to generate the driver signal for the activation of the driver circuit, as a pulse-width modulated signal with a frequency corresponding to a resonance frequency of the oscillation circuit; and a supply securing circuit which pulls the voltage at a connection point (Vp) to a reference voltage, wherein the connection point is connected to a communication lead of an interface to a supply device, and the charging device is configured to measure a voltage at the connection point and to modify a charging procedure by the charging device in accordance with the measured voltage.

5. A hand-held device with a contactless energy supply, comprising:

a secondary winding for the inductive energy transmission from a charging device to the hand-held device;

an electrical energy store chargeable via the secondary winding;

a consumer including a drive or motor; and a switching device for the switching on and off the supply of energy to the consumer by the energy store;

a protective circuit which interrupts the supply of the consumer when energy is fed into the hand-held device via the secondary winding; and a current measuring device which detects a charging current in a charging current circuit of the hand-held device, and wherein the protective circuit interrupts the supply of energy to the consumer when the charging current exceeds a threshold, wherein the current measuring device comprises a measuring rectifier which rectifies a voltage across a measuring element in the charging current circuit and forms a rectified voltage at a measuring capacitor, wherein the protective circuit interrupts the supply of the consumer when the rectified voltage exceeds a threshold.

6. A hand-held device according to claim 5, further comprising a mechanical switch which pulls a control input of the switching device to a first potential, for switching on the supply of energy to the consumer, wherein the protective circuit pulls the control input to a second potential given the occurrence of a charging current, and switches off the supply of energy to the consumer when the protective circuit pulls the control input to the second potential.

7. A hand-held device with a contactless energy supply, comprising:

a secondary winding for the inductive energy transmission from a charging device to the hard-held device;

an electrical energy store chargeable via the secondary winding;

a consumer including a drive or motor;

a switching device for the switching on and off the supply of energy to the consumer by the energy store;

a protective circuit which interrupts the supply of the consumer when energy is fed into the hand-held device via the secondary winding; and an integrated circuit with a measuring input, wherein the integrated circuit is configured to switch off the consumer should a voltage at the measuring input exceed a first threshold value, wherein the integrated circuit is configured to process the voltage at the measuring input as the battery voltage when the voltage at the measuring input falls short of a second threshold value, and to display a charging state of the electrical energy store to a user via a display in accordance with the battery voltage.

8. A hand-held device according to claim 7, further comprising a battery voltage measuring resistor which pulls the voltage at a measuring capacitor to the battery voltage.

9. A hand-held device according to claim 5, further comprising a hand-held device coil body, wherein the electrical energy store comprises a battery chargeable via the secondary winding, wherein the secondary winding is arranged on the hand-held device coil body, wherein the hand-held device coil body comprises a support section which is integrally formed as one piece, the support section being elastically deformable, and wherein in the operationally ready state of the hand-held device, the hand-held device coil body with its support section presses against the battery, thereby resiliently fixing the battery.

10. A hand-held device with a contactless energy supply, comprising:
   a secondary winding for the inductive energy transmission from a charging device to the hand-held device;
   an electrical energy store chargeable via the secondary winding and comprising a battery;
   a control unit;
   a battery voltage measurement device for measuring a battery voltage;
   a detection circuit for detecting whether the hand-held device is suppliable with energy by a charging part; and
   an isolating circuit, by which a charging of the battery can be interrupted,
   wherein the control unit is configured to charge the battery during a defined minimum charging time if the battery voltage has fallen short of a minimum value, and to continue charging the battery during the defined minimum charging time without regard to the battery voltage during the minimum charging time.

11. A hand-held device, according to claim 10, wherein the control unit is further configured to resume the charging of the battery, until the minimum charging time is reached, in the case that the charging of the battery is interrupted before reaching the minimum charging time, and the hand-held device is subsequently again suppliable with energy by the charging part.

12. A hand-held device, according to claim 10, wherein the control unit is further configured, after the minimum charging time has been reached and the hand-held device continues to be suppliable with energy by the charging part, to resume the charging of the battery, in the case that the battery voltage falls short of a lower threshold value.

13. A hand-held device, according to claim 12, wherein the control unit is further configured to again interrupt the charging of the battery, in the case that the battery voltage exceeds an upper threshold value.

14. A method for charging an energy store of a small mobile electrical device with a contactless energy supply, wherein the small mobile electrical device comprises a control unit, a battery, a battery voltage measurement for measuring a battery voltage, a detection circuit for detecting whether the hand-held device is suppliable with energy by a charging part, and an isolating circuit configured to interrupt charging of the battery, the method comprising the steps of:
   determining whether the battery voltage falls below a minimum value;
   charging the battery during a defined minimum charging time if the determining step determines that the battery voltage falls below the minimum value; and
   continuing to charge the battery during the defined minimum charging time without regard to the battery voltage during the minimum charging time.

15. A method according to claim 14, wherein the minimum value comprises a minimum voltage for operation of the control unit.

* * * * *